(12) United States Patent
Akl et al.

(10) Patent No.: US 11,672,031 B2
(45) Date of Patent: Jun. 6, 2023

(54) MANAGING A BACKHAUL CONFIGURATION IN A WIRELESS MULTI-HOP NETWORK

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Luis Fernando Brisson Lopes, Swindon (GB); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/332,325

(22) Filed: May 27, 2021

(65) Prior Publication Data

US 2021/0385888 A1    Dec. 9, 2021

Related U.S. Application Data

(60) Provisional application No. 63/034,224, filed on Jun. 3, 2020.

(51) Int. Cl.
*H04W 76/12*    (2018.01)
*H04W 28/18*    (2009.01)
*H04W 76/15*    (2018.01)

(52) U.S. Cl.
CPC ........... *H04W 76/12* (2018.02); *H04W 28/18* (2013.01); *H04W 76/15* (2018.02)

(58) Field of Classification Search
CPC ..... H04W 76/12; H04W 76/15; H04W 28/18; H04W 12/02; H04L 63/00; H04L 69/14; H04L 1/0001; H04B 7/02; H04B 7/26
See application file for complete search history.

(56) References Cited

U.S. PATENT DOCUMENTS

| | | | | |
|---|---|---|---|---|
| 2001/0036167 A1* | 11/2001 | Menon | ................... | H04W 76/12 370/337 |
| 2010/0260097 A1* | 10/2010 | Ulupinar | ............... | H04W 40/36 370/315 |

(Continued)

FOREIGN PATENT DOCUMENTS

| WO | WO-2019184890 A1 | 10/2019 |
|---|---|---|
| WO | WO-2019212546 A1 | 11/2019 |

OTHER PUBLICATIONS

International Search Report and Written Opinion—PCT/US2021/034829—ISA/EPO—dated Sep. 13, 2021.

*Primary Examiner* — Mewale A Ambaye
(74) *Attorney, Agent, or Firm* — Harrity & Harrity, LLP

(57) ABSTRACT

A first control node may communicate with a user equipment (UE) using an integrated access and backhaul (IAB) network, and a second control node may manage a configuration of the IAB network. The second control node may not have the information needed to configure the IAB network, such as quality of service (QoS) information associated with a data radio bearer (DRB) used for communications between the first control node and the UE, and thus may not be able to configure a user plane interface tunnel and/or a radio link control (RLC) channel to assist with satisfying the QoS level. Some techniques and apparatuses described herein enable the second control node to receive QoS information associated with setting up a user plane interface tunnel (Continued)

between the first control node and an IAB node that serves a UE for which the user plane interface tunnel is being set up.

30 Claims, 15 Drawing Sheets

(56) References Cited

U.S. PATENT DOCUMENTS

| | | | |
|---|---|---|---|
| 2018/0014339 A1* | 1/2018 | Baek | H04W 76/10 |
| 2018/0063753 A1* | 3/2018 | Cao | H04W 76/12 |
| 2021/0007011 A1* | 1/2021 | Zhu | H04B 17/40 |
| 2021/0385888 A1* | 12/2021 | Akl | H04W 76/15 |

* cited by examiner

MANAGING A BACKHAUL CONFIGURATION IN A WIRELESS MULTI-HOP NETWORK

CROSS-REFERENCE TO RELATED APPLICATION

This Patent application claims priority to Provisional Patent Application No. 63/034,224, filed on Jun. 3, 2020, entitled "MANAGING A BACKHAUL CONFIGURATION IN A WIRELESS MULTI-HOP NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for managing a backhaul configuration in a wireless multi-hop network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A first control node may communicate with a user equipment (UE) using an integrated access and backhaul (IAB) network, and a second control node may manage a configuration of the IAB network. The second control node may not have the information needed to configure the IAB network, such as quality of service (QoS) information associated with a data radio bearer (DRB) used for communications between the first control node and the UE, and thus may not be able to configure a user plane interface tunnel and/or a radio link control (RLC) channel to assist with satisfying the QoS level. Some techniques and apparatuses described herein enable the second control node to receive QoS information associated with setting up a user plane interface tunnel between the first control node and an IAB node that serves a UE for which the user plane interface tunnel and associated DRB is being set up.

In some aspects, a method of wireless communication, performed by a node, may include receiving, via a first signaling connection with a control node, a request to set up or modify a user plane interface tunnel associated with the control node and a child node of the node; transmitting, via a second signaling connection with a management node that manages a wireless multi-hop network configuration for the control node, an indication of quality of service information associated with the request from the control node; and receiving, via the second signaling connection with the management node, a backhaul configuration for the wireless multi-hop network based at least in part on the indication of the quality of service information.

In some aspects, a method of wireless communication, performed by a management node, may include receiving, from a node that has a first signaling connection with the control node and a second signaling connection with the management node, an indication of quality of service information associated with a request, received by the node via the first signaling connection with the control node, to set up or modify a user plane interface tunnel associated with the control node and a child node of the node; and transmitting, to the node via the second signaling connection or to a second node included in a route of the user plane interface tunnel, a backhaul configuration for a wireless multi-hop network based at least in part on the indication of the quality of service information.

In some aspects, a node for wireless communication may include a memory and one or more processors coupled to the memory. The memory and the one or more processors may be configured to receive, via a first signaling connection with a control node, a request to set up or modify a user plane interface tunnel associated with the control node and a child node of the node; transmit, via a second signaling connection with a management node that manages a wireless multi-hop network configuration for the control node, an indication of quality of service information associated with the request from the control node; and receive, via the second signaling connection with the management node, a backhaul configuration for the wireless multi-hop network based at least in part on the indication of the quality of service information.

In some aspects, a management node for wireless communication may include a memory and one or more processors coupled to the memory. The memory and the one or more processors may be configured to receive, from a node that has a first signaling connection with a control node and a second signaling connection with the management node, an indication of quality of service information associated with a request, received by the node via the first signaling connection with the control node, to set up or modify a user plane interface tunnel associated with the control node and a child node of the node; and transmit, to the node via the second signaling connection or to a second node included in a route of the user plane interface tunnel, a backhaul configuration for a wireless multi-hop network based at least in part on the indication of the quality of service information.

In some aspects, a non-transitory computer-readable medium may store one or more instructions for wireless communication. The one or more instructions, when executed by one or more processors of a node, may cause the one or more processors to receive, via a first signaling connection with a control node, a request to set up or modify a user plane interface tunnel associated with the control node and a child node of the node; transmit, via a second signaling connection with a management node that manages a wireless multi-hop network configuration for the control node, an indication of quality of service information associated with the request from the control node; and receive, via the second signaling connection with the management node, a backhaul configuration for the wireless multi-hop network based at least in part on the indication of the quality of service information.

In some aspects, a non-transitory computer-readable medium may store one or more instructions for wireless communication. The one or more instructions, when executed by one or more processors of a management node, may cause the one or more processors to receive, from a node that has a first signaling connection with a control node and a second signaling connection with the management node, an indication of quality of service information associated with a request, received by the node via the first signaling connection with the control node, to set up or modify a user plane interface tunnel associated with the control node and a child node of the node; and transmit, to the node via the second signaling connection or to a second node included in a route of the user plane interface tunnel, a backhaul configuration for a wireless multi-hop network based at least in part on the indication of the quality of service information.

In some aspects, an apparatus for wireless communication may include means for receiving, via a first signaling connection with a control node, a request to set up or modify a user plane interface tunnel associated with the control node and a child node of the apparatus; means for transmitting, via a second signaling connection with a management node that manages a wireless multi-hop network configuration for the control node, an indication of quality of service information associated with the request from the control node; and means for receiving, via the second signaling connection with the management node, a backhaul configuration for the wireless multi-hop network based at least in part on the indication of the quality of service information.

In some aspects, an apparatus for wireless communication may include means for receiving, from a node that has a first signaling connection with a control node and a second signaling connection with the apparatus, an indication of quality of service information associated with a request, received by the node via the first signaling connection with the control node, to set up or modify a user plane interface tunnel associated with the control node and a child node of the node; and means for transmitting, to the node via the second signaling connection or to a second node included in a route of the user plane interface tunnel, a backhaul configuration for a wireless multi-hop network based at least in part on the indication of the quality of service information.

Aspects generally include a method, apparatus, system, computer program product, non-transitory computer-readable medium, user equipment, base station, node, IAB node, management node, IAB donor, control node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
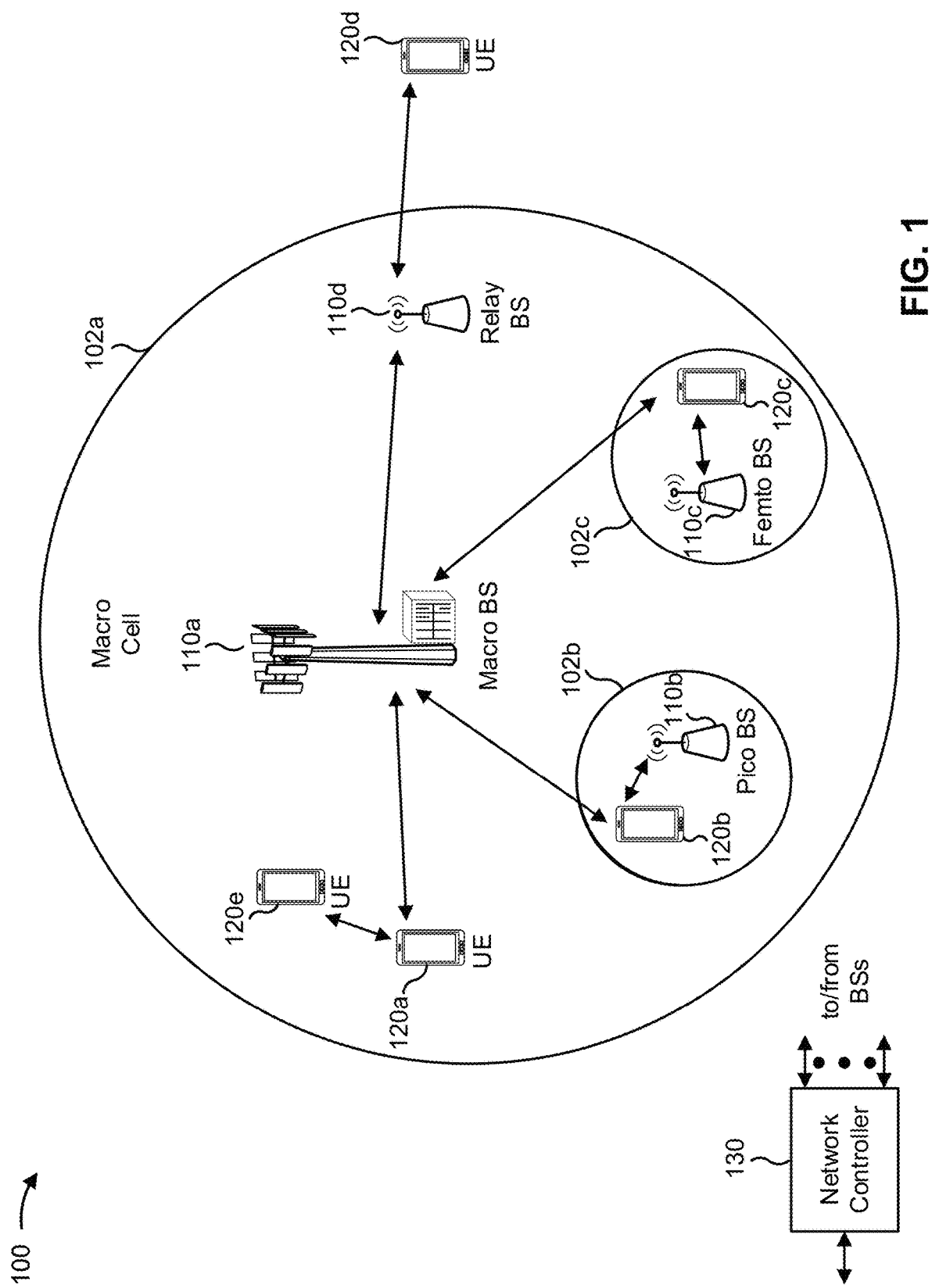
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G B S, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
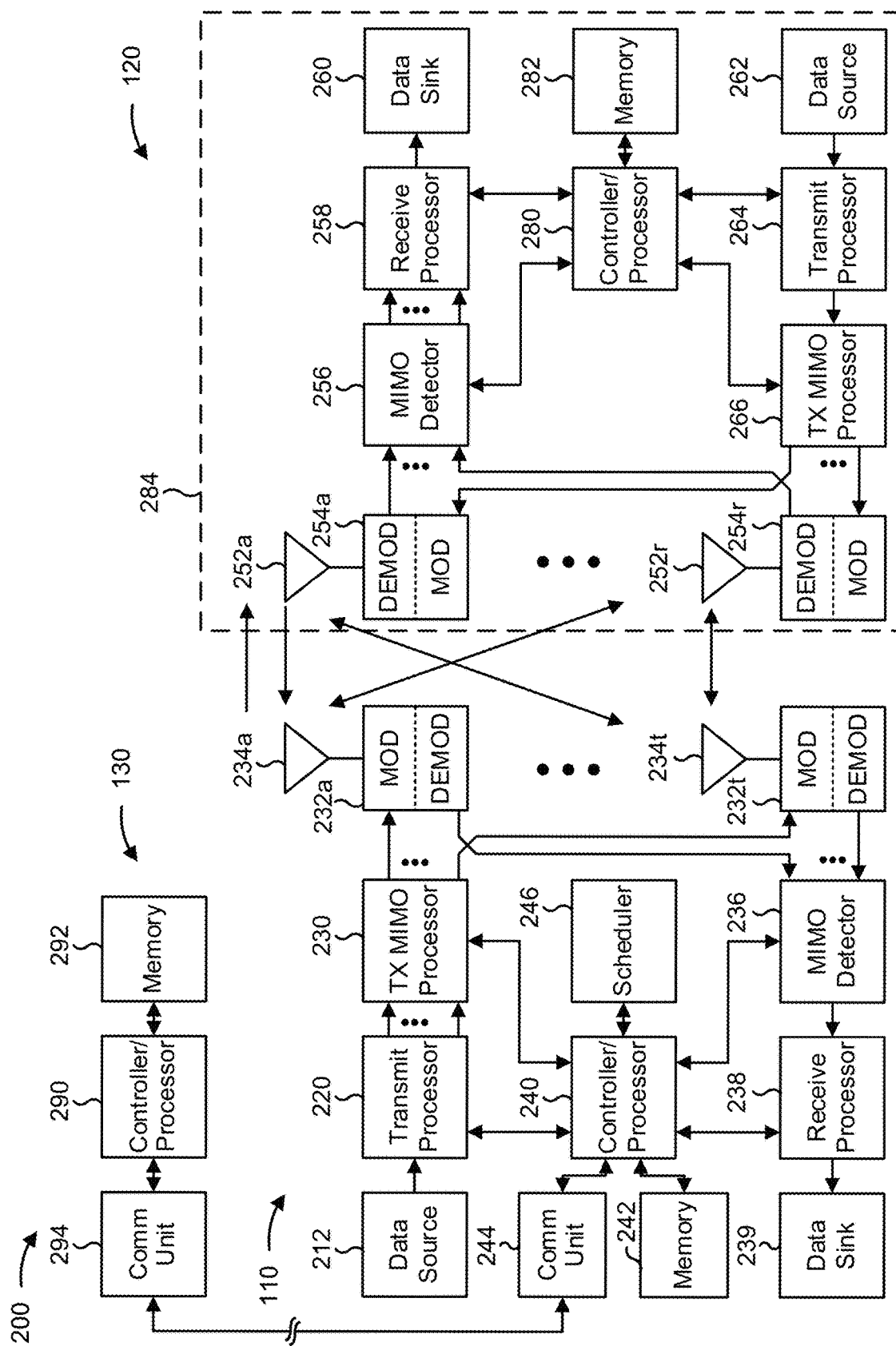
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with managing a backhaul configuration in a wireless multi-hop network, as described in more detail elsewhere herein. For example, controller/processor 240 of base station 110, controller/processor 280 of UE 120, and/or any other component(s) of FIG. 2 may perform or direct operations of, for example, method 1000 of FIG. 10, method 1100 of FIG. 11, and/or other processes as described herein. Memories 242 and 282 may store data and program codes for BS 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, method 1000 of FIG. 10, method 1100 of FIG. 11, and/or other processes as described herein. In some aspects, executing instructions may include running the instructions, converting the instructions, compiling the instructions, interpreting the instructions, and/or the like.

As indicated above, FIG. 2 is provided as an example. Other examples may differ from what is described with regard to FIG. 2.

Figure 3:
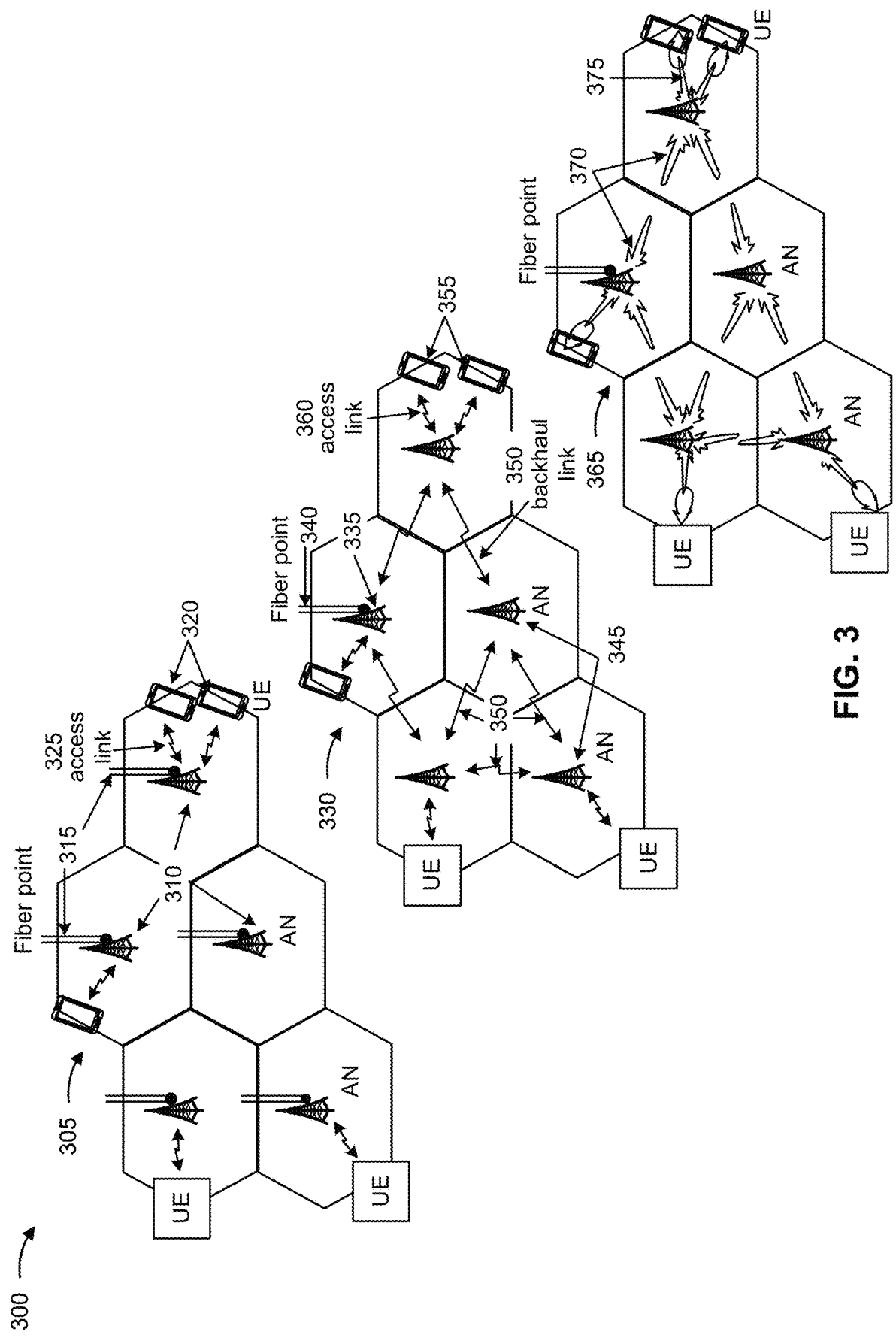
FIG. 3 is a diagram illustrating examples of radio access networks.

FIG. 3 is a diagram illustrating examples 300 of radio access networks. As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
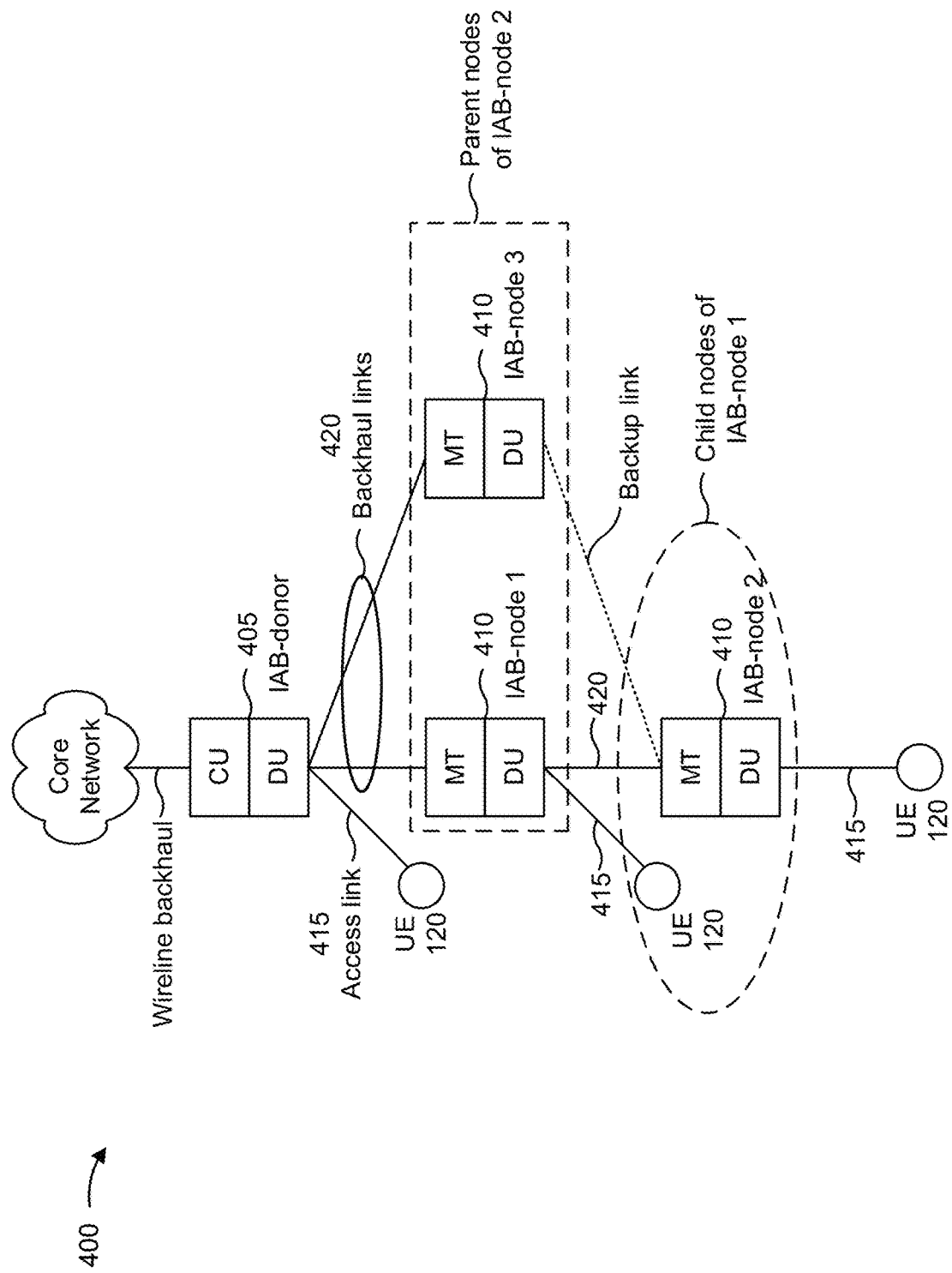
FIG. 4 is a diagram illustrating an example of an integrated access and backhaul (IAB) network architecture.

FIG. 4 is a diagram illustrating an example 400 of an IAB network architecture. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

An access link 415 may include one or more access radio link control (RLC) channels. An access RLC channel may carry packet data convergence protocol (PDCP) communications (e.g., radio resource control (RRC) communications, data radio bearer communications, and/or the like) from a UE 120 or an MT function of an IAB node 410 to a DU function of an IAB donor 405 or an IAB node 410.

A backhaul link 420 may include one or more backhaul RLC channels. A backhaul RLC channel may carry backhaul adaptation protocol (BAP) communications (e.g., for backhauling of access traffic) from an MT function of an IAB node 410 to a DU function of an IAB donor 405 or an IAB node 410 (e.g., respective backhaul RLC channels may be between hops on a route from an access IAB node 410 and a DU function of an IAB donor 405). Accordingly, a radio bearer for access traffic of a UE 120 or an MT function of an IAB node 410 (e.g., a data radio bearer) may be mapped to a backhaul RLC channel, which may be an existing backhaul RLC channel or a backhaul RLC channel that was established for the radio bearer. As a result, different mappings between radio bearers and backhaul RLC channels may be possible. For example, a particular backhaul RLC channel may be mapped to a single radio bearer or multiple radio bearers, such as two radio bearers or three radio bearers.

As indicated above, FIG. 4 is provided as an example. Other examples may differ from what is described with regard to FIG. 4.

Figure 5:
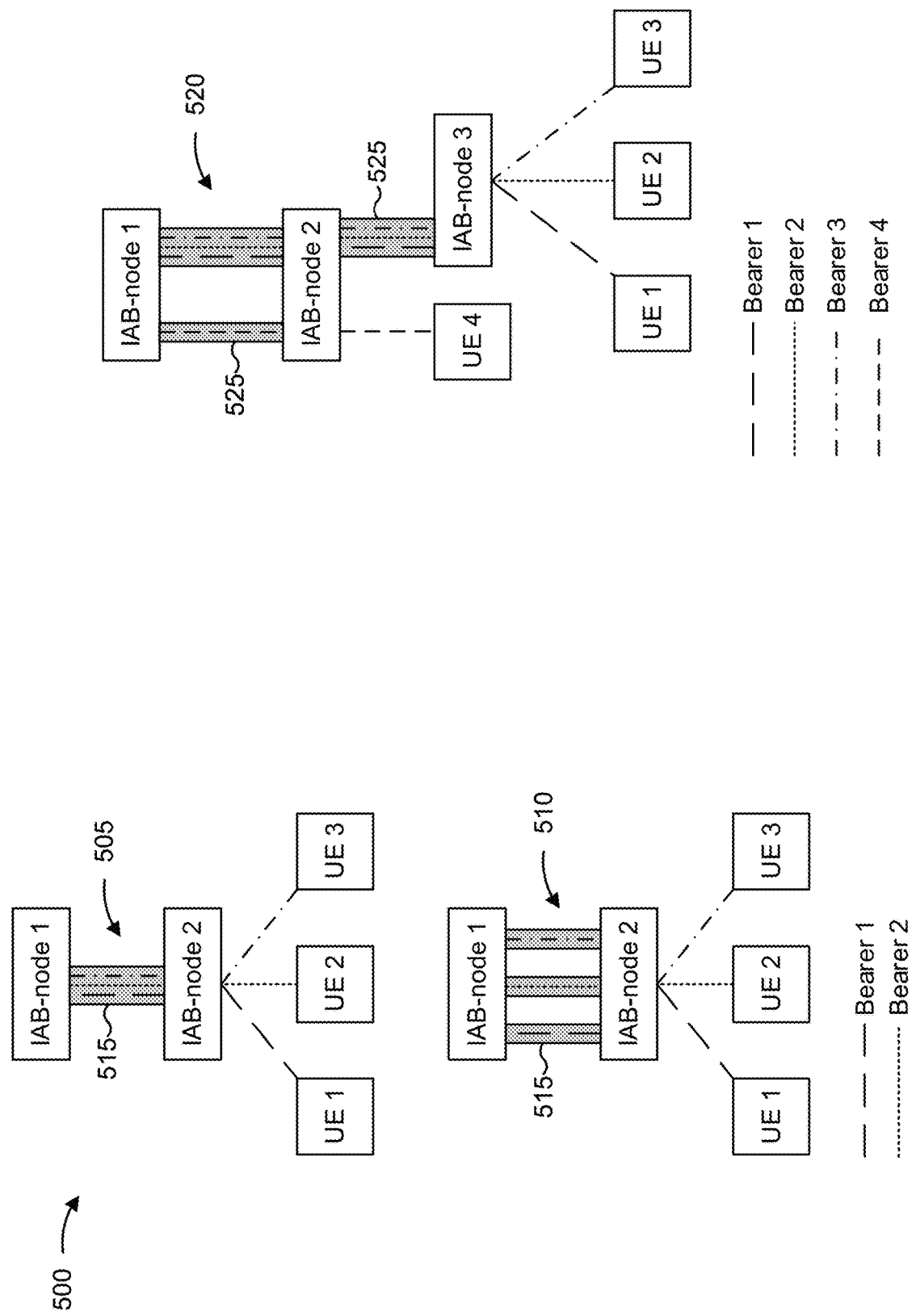
FIG. 5 is a diagram illustrating an example of routing and backhaul channel management in an IAB network.

FIG. 5 is a diagram illustrating an example 500 of routing and backhaul channel management in an IAB network. As shown in FIG. 5, and by network 505 and network 510, a first IAB node (shown as IAB-node 1) and a second IAB node (shown as IAB-node 2) may communicate with one another using one or more backhaul RLC channels 515. The backhaul RLC channels 515 may be used for backhauling of access traffic of a first UE (shown as UE 1), a second UE (shown as UE 2), and a third UE (shown as UE 3).

Traffic for the first UE may be associated with a first radio bearer (shown as Bearer 1), traffic for the second UE may be associated with a second radio bearer (shown as Bearer 2), and traffic for the third UE may be associated with a third radio bearer (shown as Bearer 3). As shown in connection with network 505, in some examples, the first, second, and third radio bearers may be mapped to a single RLC channel 515 between the first and second IAB nodes. In other words, the mapping between the radio bearers and the RLC channel 515 may be 3:1. As shown in connection with network 510, in some examples, the first radio bearer may be mapped to a first RLC channel 515 between the first and second IAB nodes, the second radio bearer may be mapped to a second RLC channel 515 between the first and second IAB nodes, and the third radio bearer may be mapped to a third RLC channel 515 between the first and second IAB nodes. In other words, the mapping between the radio bearers and the RLC channels 515 may be 1:1.

As shown by network 520, a first IAB node (shown as IAB-node 1) and a second IAB node (shown as IAB-node 2) may communicate using multiple backhaul RLC channels 525. The backhaul RLC channels 525 between the first and second IAB nodes may be used for backhauling of access traffic of a first UE (shown as UE 1), a second UE (shown as UE 2), a third UE (shown as UE 3), and a fourth UE (shown as UE 4). As also shown by network 520, the second IAB node and a third IAB node (shown as IAB-node 3) may also communicate on a backhaul RLC channel 525. The backhaul RLC channel 525 between the second and third IAB nodes may be used for backhauling of access traffic of the first UE, the second UE, and the third UE.

Traffic for the first UE may be associated with a first radio bearer (shown as Bearer 1), traffic for the second UE may be associated with a second radio bearer (shown as Bearer 2), traffic for the third UE may be associated with a third radio bearer (shown as Bearer 3), and traffic for the fourth UE may be associated with a fourth radio bearer (shown as Bearer 4). As shown, the first, second, and third radio bearers may be mapped to a first RLC channel 525 (e.g., a 3:1 mapping) between the first and second IAB nodes, and the fourth radio bearer may be mapped to a second RLC channel 525 between the first and second IAB nodes (e.g., a 1:1 mapping). As shown, the first, second, and third radio bearers also may be mapped to an RLC channel 525 (e.g., a 3:1 mapping) between the second and third IAB nodes.

Using multiple RLC channels for communications between IAB nodes enables finer granularity for quality of service (QoS) differentiation. For example, if a single RLC channel is used, then all communications transmitted via the single RLC channel may be managed and/or scheduled using the same QoS parameters. However, different bearers that are mapped to the single RLC channel may be associated with different QoS levels. Using separate RLC channels for bearers associated with different QoS levels enables nodes in an IAB network to manage and/or schedule data for a specific bearer according to a QoS level associated with that specific bearer. This assists with satisfying QoS parameters for the IAB network.

As indicated above, FIG. 5 is provided as an example. Other examples may differ from what is described with regard to FIG. 5.

Figure 6:
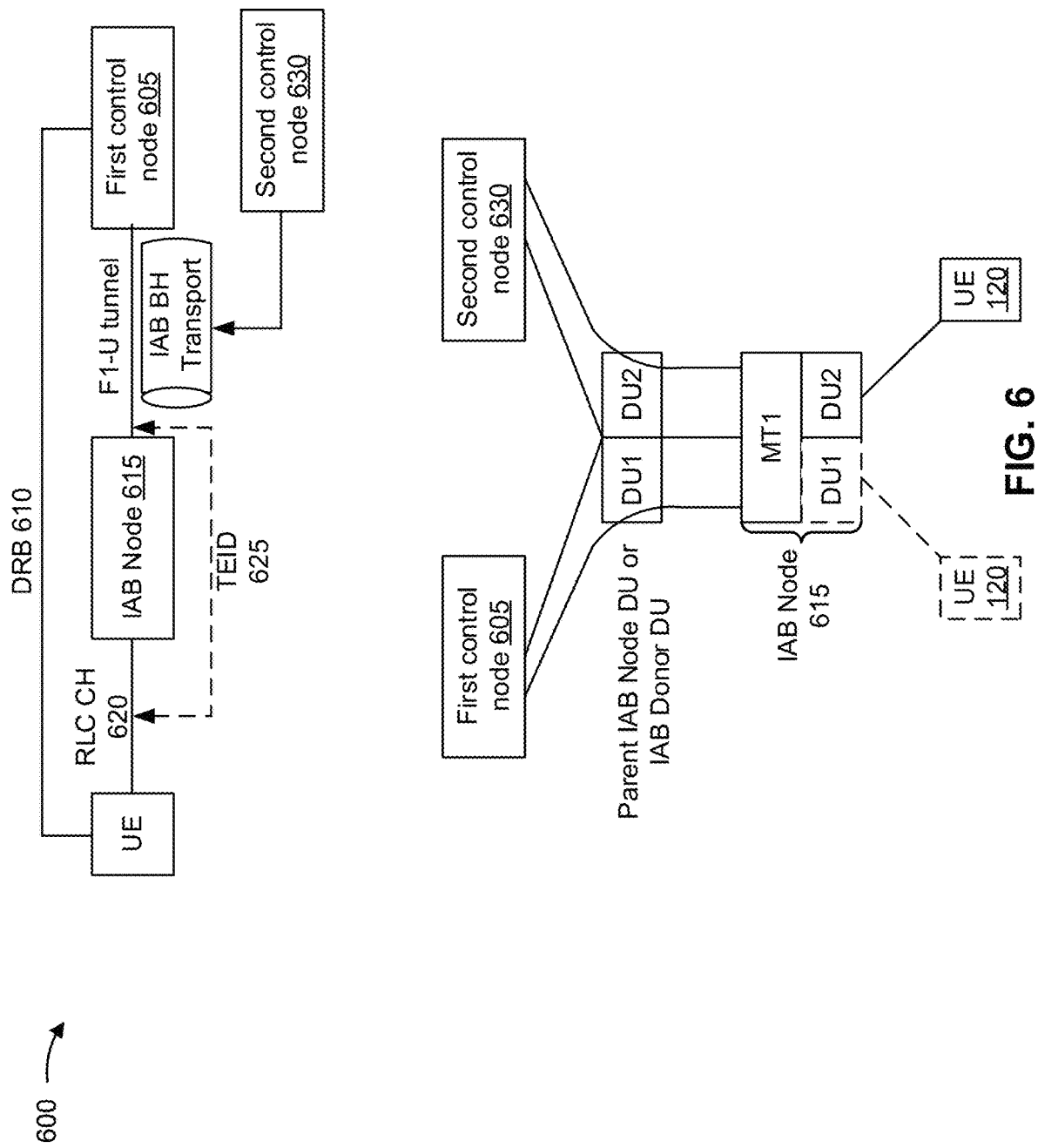
FIG. 6 is a diagram illustrating an example of delegation of transport management in an IAB network.

FIG. 6 is a diagram illustrating an example 600 of delegation of transport management in an IAB network. As shown in FIG. 6, a first control node 605 may communicate with a UE 120 via an IAB network using a data radio bearer (DRB) 610. The DRB 610 or a network traffic flow mapped to the DRB 610 may be associated with a QoS level (e.g., a QoS class, a set of QoS parameters, and/or the like). The IAB network may include one or more IAB nodes 615 that act as hops or intermediary nodes between the first control node 605 and the UE 120, as described elsewhere herein.

When a DRB 610 is set up between the first control node 605 and the UE 120, a user plane interface tunnel (e.g., an F1 user plane interface (F1-U) tunnel) may be set up between the first control node 605 and a DU of the IAB node 615 that serves the UE 120. In some examples, the F1-U tunnel may span multiple IAB nodes 615 (e.g., if there are multiple IAB nodes 615 on a route from the first control node 605 to the UE 120). Furthermore, an access RLC channel 620 may be set up between the UE 120 and an IAB node 615 that serves the UE 120. In some examples, one or more backhaul RLC channels may be set up between pairs of IAB nodes 615 included in a route associated with the F1-U tunnel. A tunnel endpoint identifier (TEID) 625 may be used to indicate a mapping between an RLC channel and an F1-U tunnel.

In some examples, a second control node 630 may manage a configuration of an IAB network used for communications between the first control node 605 and the UE 120. For example, the first control node 605 may not be an IAB donor, but may instead be a base station without IAB network configuration capabilities. Alternatively, the first control node 605 may be a first IAB donor, but the IAB network may be managed by a second IAB donor (e.g., the second control node 630). In such examples, the second control node 630 may not have the information needed to appropriately configure the IAB network. For example, the second control node 630 may not have information regarding a QoS level associated with the DRB 610, and thus may not be able to configure an F1-U tunnel, an RLC channel, and/or the like to assist with satisfying the QoS level. Some techniques and apparatuses described herein enable a second control node 630, that manages an IAB network configuration for a first control node 605, to receive QoS information associated with setting up (or modifying) an F1-U tunnel between the first control node 605 and an IAB node 615 that serves a UE 120 for which the F1-U tunnel (e.g., and associated DRB) is being set up (or modified). In this way, network performance may be improved, QoS parameters may be satisfied, and/or the like.

As indicated above, FIG. 6 is provided as an example. Other examples may differ from what is described with regard to FIG. 6.

Figure 7:
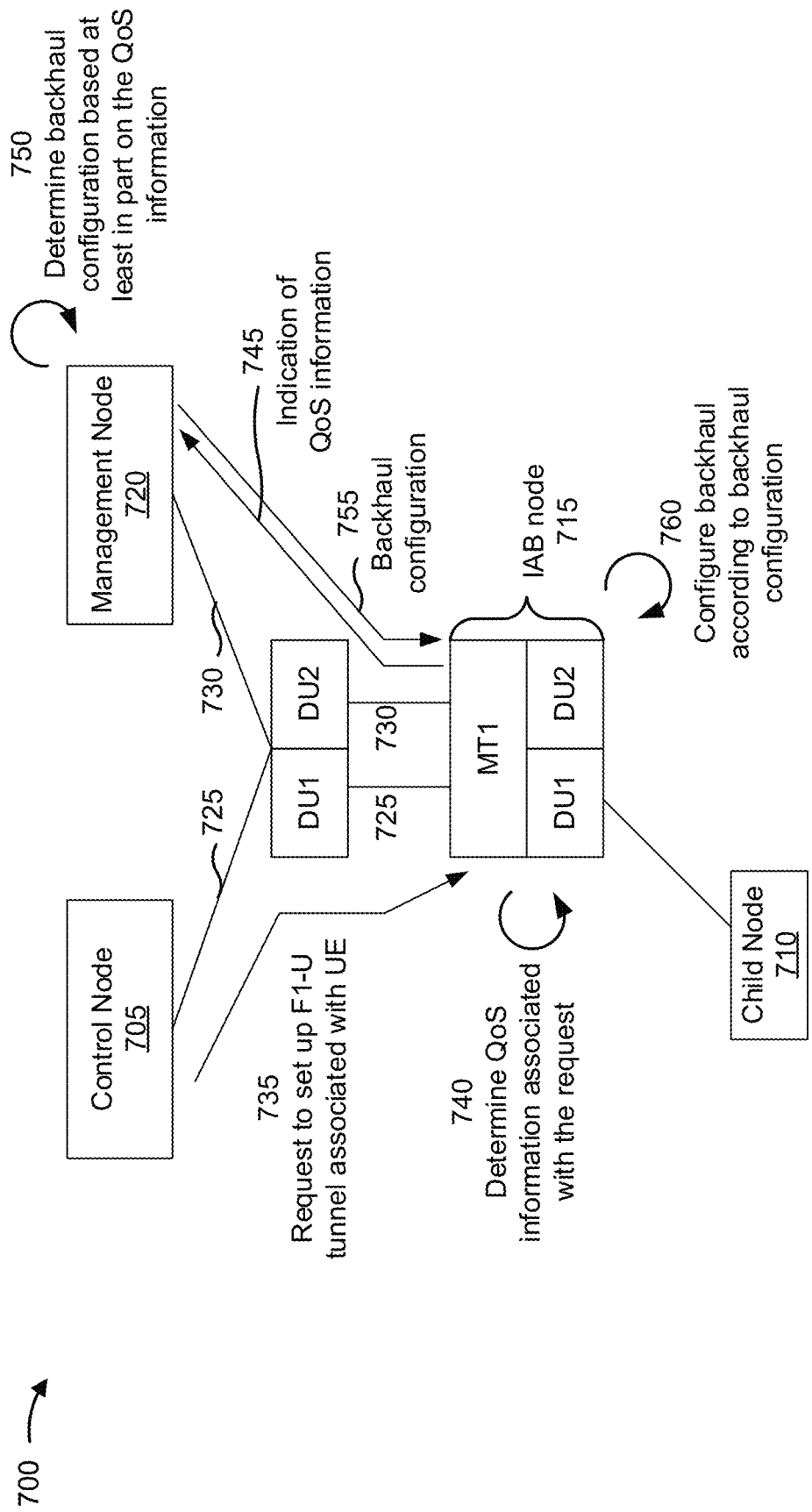
FIGS. 7-9 are diagrams illustrating examples associated with managing a backhaul configuration in a wireless multi-hop network.

FIG. 7 is a diagram illustrating an example 700 associated with managing a backhaul configuration in a wireless multi-hop network. As shown in FIG. 7, a control node 705 may communicate with a child node 710 (e.g., a UE 120 or an MT component of an IAB node) via one or more IAB nodes 715 that act as hops or intermediary nodes between the control node 705 and the child node 710. The IAB node 715 shown in FIG. 7 may be an IAB node that serves the child node 710 (e.g., that communicates directly with the child node 710 via an access link without any other IAB nodes 715 as intermediaries between the IAB node 715 and the child node 710) or may be an IAB node that does not directly serve the child node 710 but that is included in a route from the control node 705 to the child node 710.

As described above, the control node 705 may communicate with the child node 710 via an IAB network using a DRB (e.g., after the DRB is set up). The DRB or a network traffic flow mapped to the DRB may be associated with a QoS level (e.g., a QoS class, a set of QoS parameters, and/or the like). A management node 720 may manage a configuration of an IAB network used for communication between the control node 705 and the child node 710. For example, the control node 705 may not be an IAB donor, but may instead be a base station (e.g., a gNB) without IAB network configuration capabilities. Alternatively, the control node 705 may be a first IAB donor, but the IAB network may be managed by a second IAB donor (e.g., the management node 720). In some aspects, the control node 705 and the management node 720 are physically separate from one another. For example, the control node 705 and the management node 720 may be implemented in separate base stations, separate TRPs, separate IAB donors, separate nodes, and/or the like.

As further shown, a first signaling connection 725 may be used for communications between the IAB node 715 (e.g., an MT component of the IAB node 715) and the control node 705 (e.g., a DU component of the control node 705, shown as DU1). The first signaling connection 725 may include, for example, an RRC connection, an F1 control plane (F1-C) connection, and/or the like. As also shown, a second signaling connection 730 may be used for communications between the IAB node 715 (e.g., an MT component of the IAB node 715) and the management node 720 (e.g., a DU component of the management node 720, shown as DU2). The second signaling connection 730 may include, for example, an RRC connection, an F1-C connection, and/or the like.

At 735, the IAB node 715 may receive, from the control node 705 and via the first signaling connection 725, a request to set up a user plane interface tunnel associated with the control node 705 and the child node 710. In some aspects, the user plane interface tunnel is an F1-U tunnel, as shown. Although aspects are described herein in connection with an F1-U tunnel, such aspects may also apply to another type of user plane interface tunnel. In some aspects, the child node 710 may be in an RRC connected mode (e.g., rather than an RRC idle mode or an RRC inactive mode) with the control node 705 prior to transmission of the request to set up the F1-U tunnel. For example, the DRB and the F1-U tunnel may be set up after RRC connection setup is complete In some aspects, the control node 705 may transmit the request to set up the F1-U tunnel in connection with setting up a DRB between the control node 705 and the child node 710 (e.g., a UE 120). For example, the control node 705 may request to set up an F1-U tunnel between the control node 705 (e.g., a DU component of the control node 705) and a DU of the IAB node 715 that serves the child node 710 (e.g., the UE 120). In some aspects, the F1-U tunnel may span multiple IAB nodes 715 (e.g., if there are multiple IAB nodes 715 on a route from the control node 705 to the child node 710). In some aspects, the F1-U tunnel may be mapped to the DRB. In some aspects, the request to set up the F1-U tunnel is included in a UE context setup request message or another type of F1-C message.

In some aspects, the request to set up the F1-U tunnel may indicate a QoS level (e.g., a QoS class, a set of QoS parameters, a QoS class indicator (QCI) value, and/or the like) to be used for setting up the F1-U tunnel. The QoS level may be based at least in part on a QoS requirement for the DRB, which may depend on a service type associated with the DRB (e.g., a voice call, a video call, data, and/or the like), a priority level associated with the DRB, and/or the like. Thus, the request may include QoS information for a DRB between the control node 705 and the child node 710 and/or for a flow mapped to a DRB between the control node 705 and the child node 710. For example, the QoS information included in the request may include Evolved UMTS Terrestrial Radio Access Network (EUTRAN) QoS information for a DRB (e.g., for EUTRAN-NR dual connectivity (EN-DC)), may include 5G QoS information (e.g., for an NG-RAN), and/or the like.

At 740, the IAB node 715 may determine QoS information associated with the request to set up the F1-U tunnel. In some aspects, the QoS information is included in the request to set up the F1-U tunnel, and the IAB node 715 determines (e.g., extracts) the QoS information from the request. Additionally, or alternatively, the IAB node 715 may derive the QoS information from the request (e.g., based at least in part on a QoS level indicated in the request).

At 745, the IAB node 715 may transmit, to the management node 720 and via the second signaling connection 730, an indication of the QoS information associated with the request from the control node 705 to set up the F1-U tunnel. In some aspects, the QoS information transmitted by the IAB node 715 to the management node 720 may be the same as QoS information received by the IAB node 715 in the request from the control node 705. Alternatively, the QoS information transmitted by the IAB node 715 to the management node 720 may be different from QoS information received by the IAB node 715 in the request from the control node 705, such as when the IAB node 715 derives the QoS information, transmitted to the management node 720, from the request.

For example, the QoS information transmitted to the management node 720 may include a portion of the QoS information received in the request (e.g., a subset of QoS parameters indicated in the request, a QCI value indicated in the request, and/or the like). Additionally, or alternatively, the QoS information transmitted to the management node 720 may include QoS information associated with an access RLC channel between the child node 710 and the IAB node 715 or between the child node 710 and another IAB node that serves the child node 710. The access RLC channel may be set up based at least in part on the request to set up the F1-U tunnel, and/or may be mapped to the F1-U tunnel (e.g., using a TEID). Additionally, or alternatively, the QoS information transmitted to the management node 720 may include an indication of whether the access RLC channel is associated with an acknowledged mode (AM) or an unacknowledged mode (UM).

In some aspects, the indication of the QoS information transmitted by the IAB node 715 to the management node 720 may include a control node identifier that identifies the control node 705. The control node identifier may include, for example, Internet Protocol (IP) information associated with the control node 705 (e.g., an IP address of the control node 705, a DU component of the control node 705, and/or the like), a base station identifier (e.g., gNB-ID) of the control node 705, and/or the like. Additionally, or alternatively, the indication of the QoS information transmitted by the IAB node 715 to the management node 720 may include a public land mobile network (PLMN) identifier that identifies a PLMN associated with the control node 705 and/or the child node 710 (e.g., a PLMN used for communications between the control node 705 and the child node 710, a PLMN to which the child node 710 is subscribed, a PLMN for which the control node 705 provide access, and/or the like), and/or the like. Additionally, or alternatively, the indication of the QoS information transmitted by the IAB node 715 to the management node 720 may include a user plane interface tunnel identifier that identifies the user plane interface tunnel (e.g., an F1-U tunnel identifier), a DRB identifier that identifies a DRB associated with the user plane interface tunnel, a child node identifier that identifies the child node (e.g., an IP address of the child node or a UE identifier of the child node, among other examples), and/or the like.

In some aspects, the indication of the QoS information transmitted by the IAB node 715 to the management node 720 may include routing information for communicating with the control node 705. The routing information may include, for example, a backhaul adaptation protocol (BAP) address associated with the control node 705, a BAP path identifier associated with a route to the control node 705 (where the route includes one or more IAB nodes), a BAP routing identifier associated with the control node 705 (e.g., which may include a BAP address and a BAP path identifier), a BAP address for one or more IAB nodes allocated by the control node 705 (e.g., for communicating with the control node 705 along a BAP path or route), an IP address of the one or more IAB nodes (e.g., which may be derived from a DU component of the control node 705), and/or the like.

In some aspects, the indication of the QoS information transmitted by the IAB node 715 to the management node 720 may include a request for a specific backhaul configuration. The specific backhaul configuration may correspond to a QoS class, a QoS level, a set of QoS parameters, a QCI value, and/or the like. In this example, the IAB node 715 may determine the QoS information associated with the request to set up the F1-U tunnel and may identify a backhaul configuration that would assist with satisfying a QoS requirement indicated by the QoS information. The IAB node 715 may request that backhaul configuration from the management node 720. The management node 720 may approve the request for the backhaul configuration, may indicate a different backhaul configuration than the requested backhaul configuration, or may communicate further with the IAB node 715 to negotiate a backhaul configuration. Details regarding the content of the backhaul configuration (e.g., requested by the IAB node 715 and/or indicated by the management node 720) are described below.

At 750, the management node may determine a backhaul configuration based at least in part on the QoS information received from the IAB node 715. The backhaul configuration may include a configuration for an IAB network that includes the IAB node 715, a configuration for an IAB network that is managed by the management node 720 and used by the control node 705 to communicate, a configuration or one or more IAB nodes along a route from the control node 705 to the child node 710, and/or the like. The backhaul configuration may depend on the QoS information because different backhaul configurations may be needed to satisfy different QoS requirements.

In some aspects, the backhaul configuration may include a configuration for setting up a backhaul RLC channel for an MT component of the IAB node 715. The backhaul RLC channel may be a channel between the MT component of the IAB node 715 and a DU component of a parent node (e.g., a parent IAB node or a parent IAB donor) of the IAB node 715. The backhaul RLC channel may be set up based at least in part on the request to set up the F1-U tunnel, and/or may be mapped to and/or included in the F1-U tunnel.

Additionally, or alternatively, the backhaul configuration may include an uplink mapping configuration for the IAB node 715. The uplink mapping configuration may indicate a mapping between the F1-U tunnel and a BAP route (e.g., indicated by a BAP routing identifier), a mapping between the F1-U tunnel and an egress link of the IAB node 715 (e.g., indicated by a next-hop BAP address), a mapping between the F1-U tunnel and the backhaul RLC channel, and/or the like. Additionally, or alternatively, the backhaul configuration may include address information for a DU component of the IAB node that is an endpoint of the F1-U tunnel (e.g., an IAB node that serves the child node 710 and/or delivers downlink protocol data units (PDUs) to the child node 710). The address information may include, for example, an IP address, a transport network layer (TNL) address, and/or the like.

At 755, the management node 720 may transmit an indication of the backhaul configuration to the IAB node 715. In some aspects, the backhaul configuration (e.g., the backhaul RLC channel setup configuration, the uplink mapping configuration, the address information, and/or the like) may be indicated in a single message. Alternatively, the management node 720 may indicate different portions of the backhaul configuration in different messages (e.g., using the second signaling connection 730). For example, a backhaul RLC channel setup configuration and/or an uplink mapping configuration may be indicated in a first message, and address information may be indicated in a second message. As described above, in some aspects, the indication of the QoS information may include acceptance or acknowledgement of a backhaul configuration requested by the IAB node 715. Additionally, or alternatively, the management node 720 and the IAB node 715 may negotiate the backhaul configuration.

At 760, the IAB node 715 may receive the backhaul configuration from the management node 720, and the IAB node 715 may configure a backhaul (e.g., backhaul communications, one or more backhaul components, and/or the like) according to the backhaul configuration. For example, the IAB node 715 may configure a DU component of the IAB node 715 based at least in part on the backhaul configuration, may configure an MT component of the IAB node 715 based at least in part on the backhaul configuration, may configure a scheduler of the IAB node 715 based at least in part on the backhaul configuration, may schedule and/or configure communications based at least in part on the backhaul configuration, may update a mapping and/or other information stored in memory of the IAB node 715 based at least in part on the backhaul configuration, and/or the like. In this way, the IAB node 715 may be configured to increase the likelihood that a QoS requirement for a DRB between the control node 705 and the child node 710 is satisfied despite the control node 705 not being capable of managing an IAB network used for communications with the child node 710.

In some aspects, the management node 720 may transmit a backhaul configuration to multiple IAB nodes 715. For example, the management node 720 may transmit a backhaul configuration to the IAB node 715 shown in FIG. 7 and/or to one or more other IAB nodes 715. The management node 720 may transmit a backhaul configuration to multiple IAB nodes along a BAP route associated with (e.g. mapped to) the F1-U tunnel. For example, the management node 720 may transmit a backhaul configuration to multiple nodes along a BAP route between the child node 710 and the control node 705.

A backhaul configuration (i.e., a second backhaul configuration) for a second IAB node may include similar information as described above in connection with the backhaul configuration (i.e., the first backhaul configuration) for the IAB node 715 (i.e., the first IAB node). For example, the second backhaul configuration may include a backhaul RLC channel setup configuration, an uplink mapping configuration, and/or address information, and/or the like, for the second IAB node. In some aspects, the second backhaul configuration includes a configuration for setting up a backhaul RLC channel (i.e., a second backhaul RLC channel as compared to a first backhaul RLC channel associated with the IAB node 715) for an MT component of the second IAB node. Additionally, or alternatively, the second backhaul configuration may include a configuration for setting up a third backhaul RLC channel for a DU component of the second IAB node. The management node 720 may determine the second backhaul configuration based at least in part on the QoS information received (e.g., to satisfy one or more QoS requirements), in a similar manner as described above.

Additionally, or alternatively, the second backhaul configuration may indicate a mapping for downlink traffic of the F1-U tunnel between an ingress backhaul RLC channel of an MT component of the second IAB node and an egress backhaul RLC channel of a DU component of the first IAB node (e.g., when the first IAB node is a parent node of the second IAB node). The ingress backhaul RLC channel may be the second backhaul RLC channel described above, and/or the egress backhaul RLC channel may be the third backhaul RLC channel described above.

Additionally, or alternatively, the second backhaul configuration may indicate a mapping for uplink traffic of the F1-U tunnel between an ingress backhaul RLC channel of a DU component of the second IAB node and an egress backhaul RLC channel of an MT component of the first IAB node (e.g., when the second IAB node is a parent node of the first IAB node). The ingress backhaul RLC channel may be the third backhaul RLC channel described above, and/or the egress backhaul RLC channel may be the second backhaul RLC channel described above.

Additionally, or alternatively, the management node 720 may transmit a backhaul configuration (i.e., a third backhaul configuration) to the control node 705 and/or a DU component of an IAB donor that terminates a BAP route to which the F1-U tunnel is mapped. The management node 720 may determine the third backhaul configuration based at least in part on the QoS information received (e.g., to satisfy one or more QoS requirements), in a similar manner as described above. In some aspects, the third backhaul configuration may include a backhaul RLC channel configuration for the DU component of the IAB donor (e.g., a backhaul RLC channel setup configuration for a fourth RLC channel), a mapping of downlink traffic of the F1-U tunnel (e.g., and the fourth RLC channel) for the DU component of the IAB donor (e.g., based at least in part on IP header fields), and/or the like.

In some aspects, the operations described in connection with reference numbers 735 through 760 may be performed for a second F1-U tunnel. For example, the IAB node 715 may receive, from the control node 705 and via the first signaling connection 725, a second request to set up a second user plane interface tunnel (e.g., an F1-U tunnel) associated with the control node 705. In some aspects, the second F1-U tunnel may be for the same child node 710 as the F1-U tunnel described above in connection with reference numbers 735 through 760 (i.e., the first F1-U tunnel). Alternatively, the second F1-U tunnel may be for a different child node than the first F1-U tunnel. In either case, the second F1-U tunnel may be associated with a different DRB than the first F1-U tunnel. The IAB node 715 may transmit, to the management node 720 via the second signaling connection 730, a second indication of second QoS information based at least in part on the second request, in a similar manner as described above. The management node 720 may determine a backhaul configuration based at least in part on the second QoS information and may transmit an indication of the backhaul configuration to one or more nodes, in a similar manner as described above.

In some aspects, the backhaul configuration that is based at least in part on the second QoS information may indicate an RLC channel, for the second F1-U tunnel, that is separate from an RLC channel for the first F1-U tunnel. In this case, the IAB node 715 may configure and/or map an RLC channel for the first F1-U tunnel, may configure and/or map another (separate) RLC channel for the second F1-U tunnel. Alternatively, the backhaul configuration that is based at least in part on the second QoS information may indicate a shared (e.g., single) RLC channel for both the first F1-U tunnel and the second F1-U tunnel. In this case, the IAB node 715 may configure and/or map the shared RLC channel for the first F1-U tunnel and for the second F1-U tunnel.

By providing QoS information to the management node 720, the management node 720 may be enabled to appropriately configure the IAB network. In this way, network performance may be improved, QoS parameters may be satisfied, and/or the like.

As indicated above, FIG. 7 is provided as an example. Other examples may differ from what is described with regard to FIG. 7.

Figure 8:
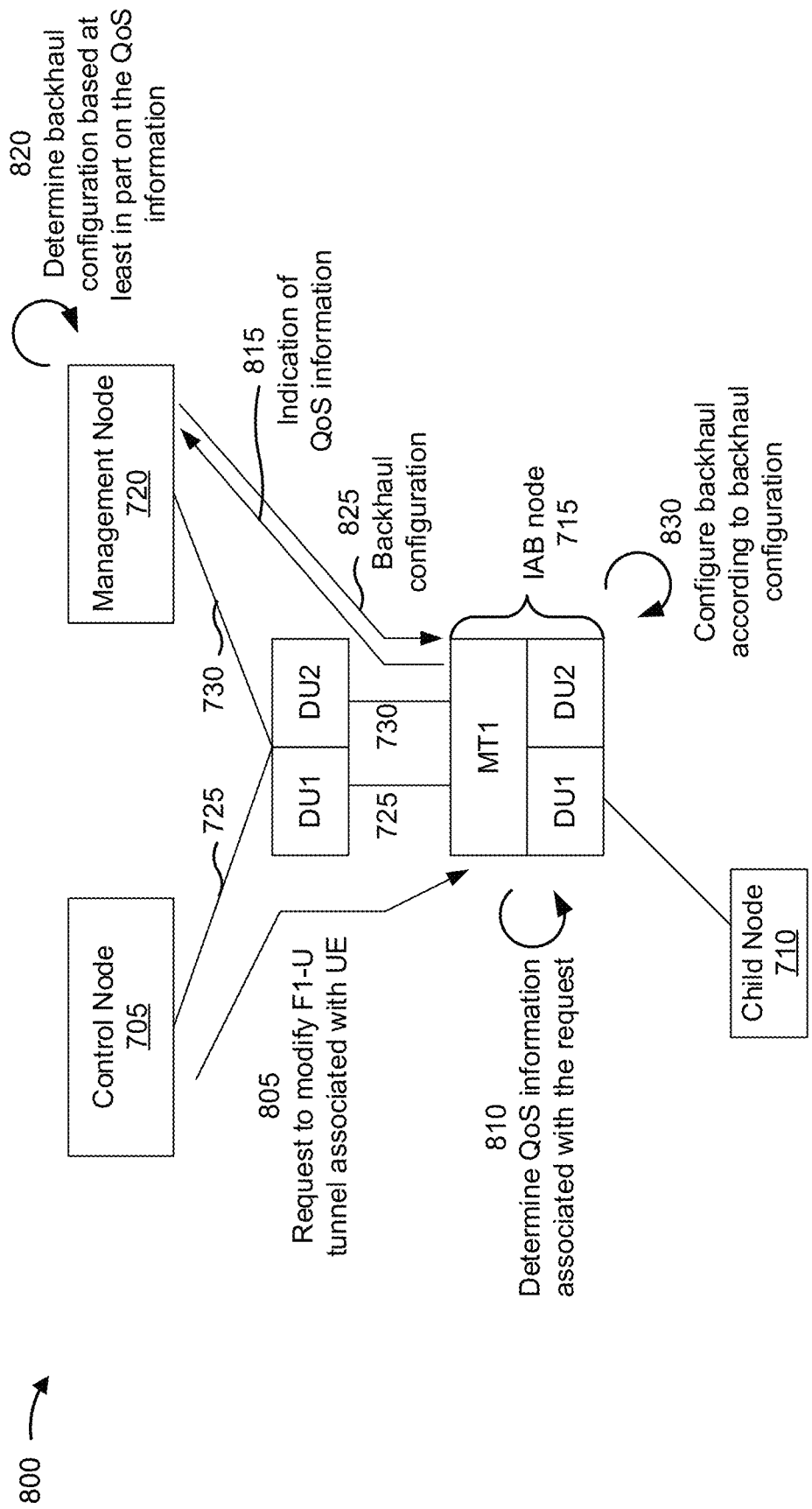

FIG. 8 is a diagram illustrating an example 800 associated with managing a backhaul configuration in a wireless multi-hop network. The nodes and signaling connections shown in FIG. 8 are described in detail above in connection with FIG. 7. Furthermore, the operations shown by reference numbers 805 through 830 are described above in connection with reference numbers 735 through 760 of FIG. 7, except that the request shown in connection with reference number 805 is a request to modify a user plane interface (e.g., F1-U) tunnel, rather than the request to set up the user plane interface tunnel described above in connection with FIG. 7.

For example, the IAB node 715 may receive, from the control node 705 and via the first signaling connection 725, a request to modify a user plane interface tunnel associated with the control node 705 and the child node 710. In some aspects, the user plane interface tunnel is an F1-U tunnel, as shown. Although aspects are described herein in connection with an F1-U tunnel, such aspects may also apply to another type of user plane interface tunnel. In some aspects, one or more operations described above in connection with FIG. 7 may be performed to set up an F1-U tunnel, and then one or more operations described in connection with FIG. 8 may be performed to modify the F1-U tunnel.

In some aspects, the control node 705 may transmit the request to modify the F1-U tunnel in connection with modifying a DRB between the control node 705 and the child node 710 (e.g., a UE 120). In some aspects, the request to modify the F1-U tunnel is included in a UE context modification request message or another type of F1-C message.

At 810, the IAB node 715 may determine QoS information associated with the request to modify the F1-U tunnel, in a similar manner as described above in connection with FIG. 7. At 815, the IAB node 715 may transmit, to the management node 720 and via the second signaling connection 730, an indication of the QoS information associated with the request from the control node 705 to modify the F1-U tunnel, in a similar manner as described above in connection with FIG. 7.

At 820, the management node may determine a backhaul configuration based at least in part on the QoS information received from the IAB node 715, in a similar manner as described above in connection with FIG. 7. At 825, the management node 720 may transmit an indication of the backhaul configuration to the IAB node 715. In some aspects, the backhaul configuration may include a configuration for setting up, modifying (e.g., by modifying a mapping to an F1-U tunnel), or removing a backhaul RLC channel for the IAB node 715 (e.g., an MT component and/or a DU component of the IAB node 715), a backhaul RLC channel for another IAB node (e.g., for an MT component and/or a DU component of one or more IAB nodes included in a route associated with the F1-U tunnel), a backhaul RLC channel for an IAB donor (e.g., the control node 705), and/or the like.

Additionally, or alternatively, the backhaul configuration may set up, modify, or remove an uplink mapping configuration for the IAB node 715, as described in more detail above in connection with FIG. 7. Additionally, or alternatively, the backhaul configuration may set up, modify, or remove address information for a DU component of the IAB node that is an endpoint of the F1-U tunnel (e.g., an IAB node that serves the child node 710 and/or delivers downlink protocol data units (PDUs) to the child node 710), as described in more detail above in connection with FIG. 7. Additionally, or alternatively, the backhaul configuration may set up, modify, or remove a configuration for ingress mapping, egress mapping, a downlink mapping of an IAB donor, and/or the like, as described in more detail above in connection with FIG. 7. In general, the backhaul configuration of FIG. 8 may be a new configuration for any of the backhaul configurations set up as described above in connection with FIG. 7, may modify any of the backhaul configurations set up described above in connection with FIG. 7, and/or may remove any of the backhaul configurations set up as described above in connection with FIG. 7.

At 830, the IAB node 715 may receive the backhaul configuration from the management node 720, and the IAB node 715 may configure a backhaul (e.g., backhaul communications, one or more backhaul components, and/or the like) according to the backhaul configuration, as described in more detail above in connection with FIG. 7. In this way, the IAB node 715 may be configured to increase the likelihood that a QoS requirement for a DRB between the control node 705 and the child node 710 is satisfied despite the control node 705 not being capable of managing an IAB network used for communications with the child node 710.

As indicated above, FIG. 8 is provided as an example. Other examples may differ from what is described with regard to FIG. 8.

Figure 9:
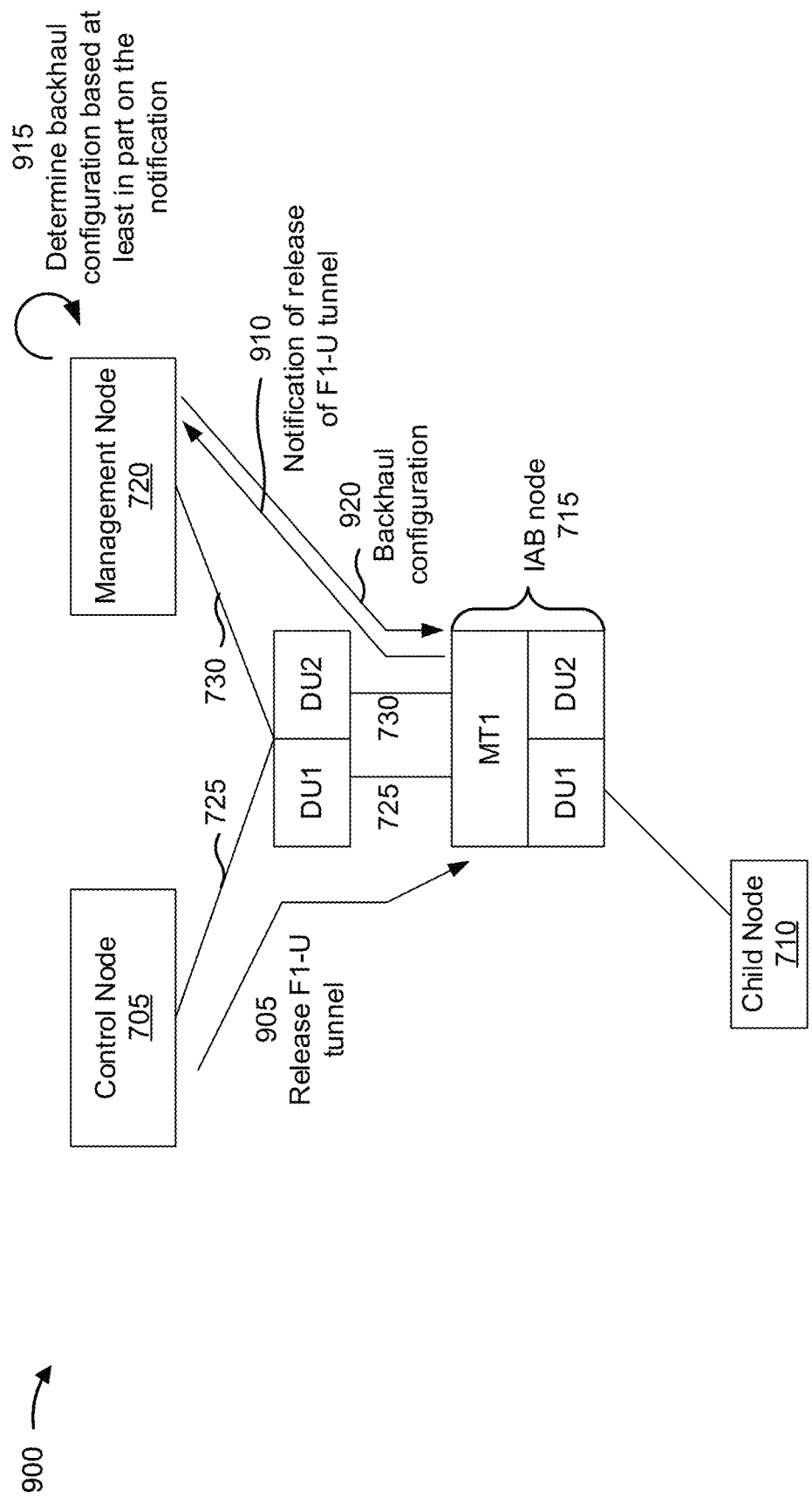

FIG. 9 is a diagram illustrating an example 900 associated with managing a backhaul configuration in a wireless multi-hop network. The nodes and signaling connections shown in FIG. 9 are described in detail above in connection with FIG. 7. FIG. 9 shows operations associated with releasing an F1-U tunnel, which may be set up as described above in connection with FIG. 7, and which may be modified one or more times as described above in connection with FIG. 8.

At 905, the control node 705 may release an F1-U tunnel, such as by transmitting a release indication to the IAB node 715. In some aspects, the release indication is transmitted via the first signaling connection 725 between the control node 705 and the IAB node 715. In some aspects, the control node 705 may transmit the release indication in connection with tearing down a DRB and/or a flow mapped to a DRB.

At 910, based at least in part on the release indication (or otherwise determining that the F1-U tunnel is to be released), the IAB node 715 may transmit, to the management node 720 via the second signaling connection 730, a notification of release of the F1-U tunnel. In some aspects, the notification may include a control node identifier that identifies the control node 705, as described elsewhere herein. Additionally, or alternatively, the notification may include a PLMN identifier as described elsewhere herein. Additionally, or alternatively, the notification may include routing information for communicating with the control node 705, as described elsewhere herein. Additionally, or alternatively, the notification may include a user plane interface tunnel identifier, a DRB identifier, a child node identifier, and/or the like, as described elsewhere herein. In this way, the management node 720 may identify one or more nodes and/or components impacted by the release of the F1-U tunnel, and generate a backhaul configuration accordingly.

At 915, the management node 720 may determine a backhaul configuration based at least in part on the notification of release received from the IAB node 715. At 920, the management node 720 may transmit an indication of the backhaul configuration to the IAB node 715. In some aspects, the backhaul configuration may include a configuration for modifying (e.g., by modifying a mapping to an F1-U tunnel) or removing a backhaul RLC channel for the IAB node 715 (e.g., an MT component and/or a DU component of the IAB node 715), a backhaul RLC channel for another IAB node (e.g., for an MT component and/or a DU component of one or more IAB nodes included in a route associated with the F1-U tunnel), a backhaul RLC channel for an IAB donor (e.g., the control node 705), and/or the like.

Additionally, or alternatively, the backhaul configuration may modify or remove an uplink mapping configuration for the IAB node 715, as described in more detail above in connection with FIG. 7. Additionally, or alternatively, the backhaul configuration may modify or remove address information for a DU component of the IAB node that is an endpoint of the F1-U tunnel (e.g., an IAB node that serves the child node 710 and/or delivers downlink protocol data units (PDUs) to the child node 710), as described in more detail above in connection with FIG. 7. Additionally, or alternatively, the backhaul configuration may modify or remove a configuration for ingress mapping, egress mapping, a downlink mapping of an IAB donor, and/or the like, as described in more detail above in connection with FIG. 7. In general, the backhaul configuration of FIG. 9 may be a new configuration (or reconfiguration) for any of the backhaul configurations set up as described above in connection with FIG. 7, may modify any of the backhaul configurations set up described above in connection with FIG. 7, and/or may remove any of the backhaul configurations set up as described above in connection with FIG. 7.

As indicated above, FIG. 9 is provided as an example. Other examples may differ from what is described with regard to FIG. 9.

Figure 10:
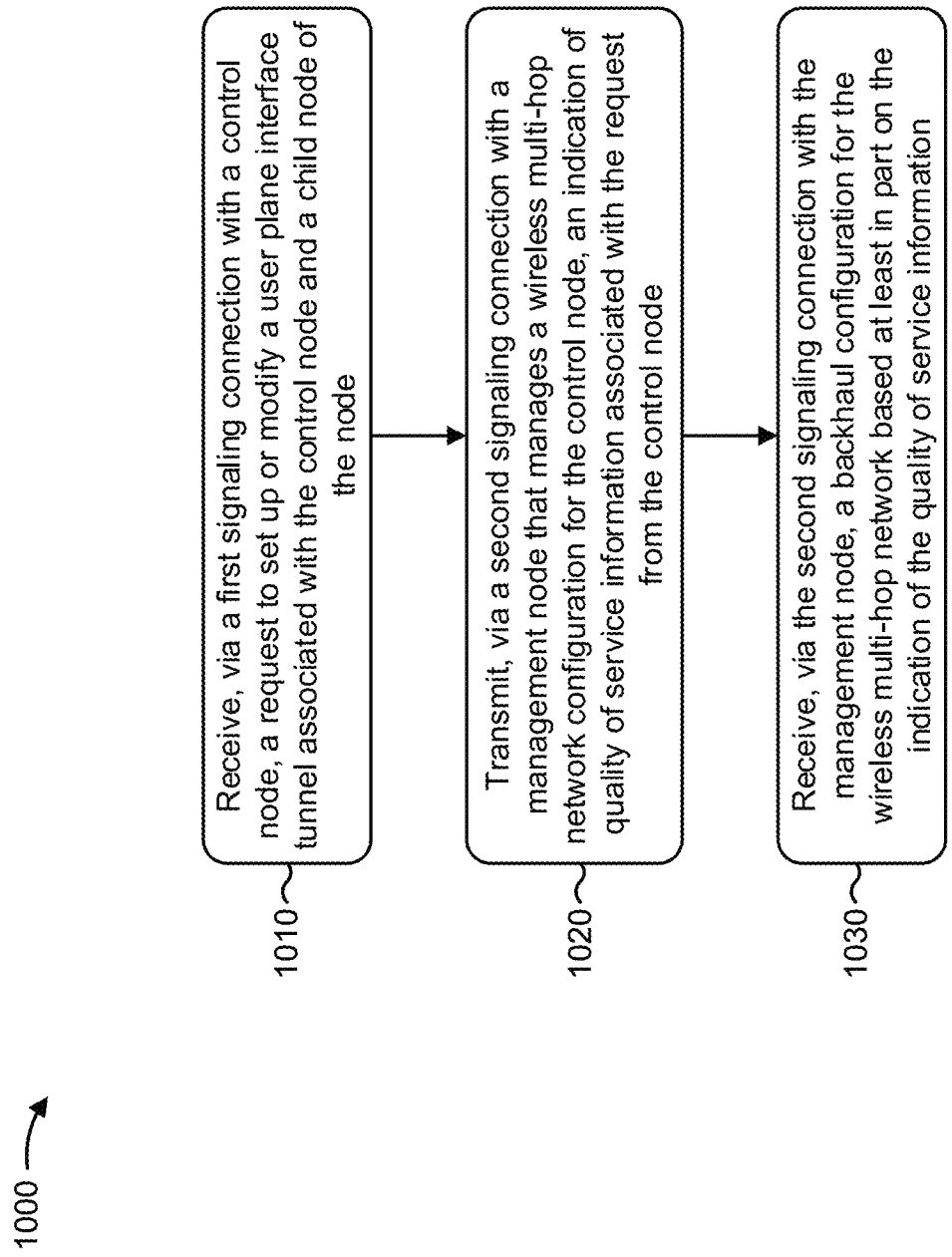
FIGS. 10 and 11 are flowcharts of example methods of wireless communication.

FIG. 10 is a flowchart of an example method 1000 of wireless communication. The method 1000 may be performed by, for example, a node (e.g., an IAB node, IAB node 715, and/or the like).

At 1010, the node may receive, via a first signaling connection with a control node, a request to set up or modify a user plane interface tunnel associated with the control node and a child node of the node. For example, the node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive, via a first signaling connection with a control node, a request to set up or modify a user plane interface tunnel associated with the control node and a child node of the node, as described above. In some aspects, the child node is in a radio resource control connected mode with the control node. In some aspects, the first signaling connection is a radio resource control connection or an F1 control plane interface connection. In some aspects, the user plane interface tunnel is an F1 user plane interface tunnel for the child node, and the child node is a user equipment or a mobile termination component of the child node.

In some aspects, the request to set up or modify the user plane interface tunnel is included in one of a user equipment context setup request message or a user equipment context modification request message. In some aspects, the request indicates at least one of: quality of service information for a data radio bearer between the control node and the child node, quality of service information for a flow mapped to a data radio bearer between the control node and the child node, or a combination thereof.

At 1020, the node may transmit, via a second signaling connection with a management node that manages a wireless multi-hop network configuration for the control node, an indication of quality of service information associated with the request from the control node. For example, the node (e.g., using antenna 234, MOD 232, transmit processor 220, TX MIMO processor 230, controller/processor 240, memory 242, antenna 252, MOD 254, TX MIMO processor 266, transmit processor 264, controller/processor 280, memory 282, and/or the like) may transmit, via a second signaling connection with a management node that manages a wireless multi-hop network configuration for the control node, an indication of quality of service information associated with the request from the control node, as described above. In some aspects, the management node is a first integrated access and backhaul (IAB) donor and the control node is a second IAB donor or a base station that is separate from the management node. In some aspects, the second signaling connection is a radio resource control connection or an F1 control plane interface connection.

In some aspects, quality of service information is included in the request or derived from the request. In some aspects, the indication of the quality of service information includes at least one of: quality of service information included in the request to set up or modify the user plane interface tunnel, a portion of quality of service information included in the request to set up or modify the user plane interface tunnel, information derived from quality of service information included in the request to set up or modify the user plane interface tunnel, quality of service information associated with an access radio link control channel, between the node and the child node, that is established based at least in part on the request to set up or modify the user plan interface tunnel, an indication of whether the access radio link control channel is associated with an acknowledged mode or an unacknowledged mode, or a combination thereof. In some aspects, the indication of the quality of service information includes at least one of: a control node identifier that identifies the control node, a public land mobile network (PLMN) identifier that identifies a PLMN of the control node or the child node, routing information for communicating with the control node, a user plane interface tunnel identifier that identifies the user plane interface tunnel, a data radio bearer identifier that identifies a data radio bearer associated with the user plane interface tunnel, a child node identifier that identifies the child node, or a combination thereof. In some aspects, the indication of the quality of service information includes a request for a specific backhaul configuration corresponding to a quality of service class.

At 1030, the node may receive, via the second signaling connection with the management node, a backhaul configuration for the wireless multi-hop network based at least in part on the indication of the quality of service information. For example, the node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive, via the second signaling connection with the management node, a backhaul configuration for the wireless multi-hop network based at least in part on the indication of the quality of service information, as described above.

In some aspects, the backhaul configuration includes at least one of: a configuration for setting up a backhaul radio link control channel at a mobile termination component of the node, an uplink mapping configuration that indicates a mapping between the user plane interface tunnel and at least one of a backhaul adaptation protocol route, an egress link of the node, or the backhaul radio link control channel, address information for a distributed unit component of the node that is an endpoint of the user plane interface tunnel, or a combination thereof. In some aspects, method 1000 includes transmitting a notification of release of the user plane interface tunnel; and receiving an updated backhaul configuration based at least in part on the notification.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
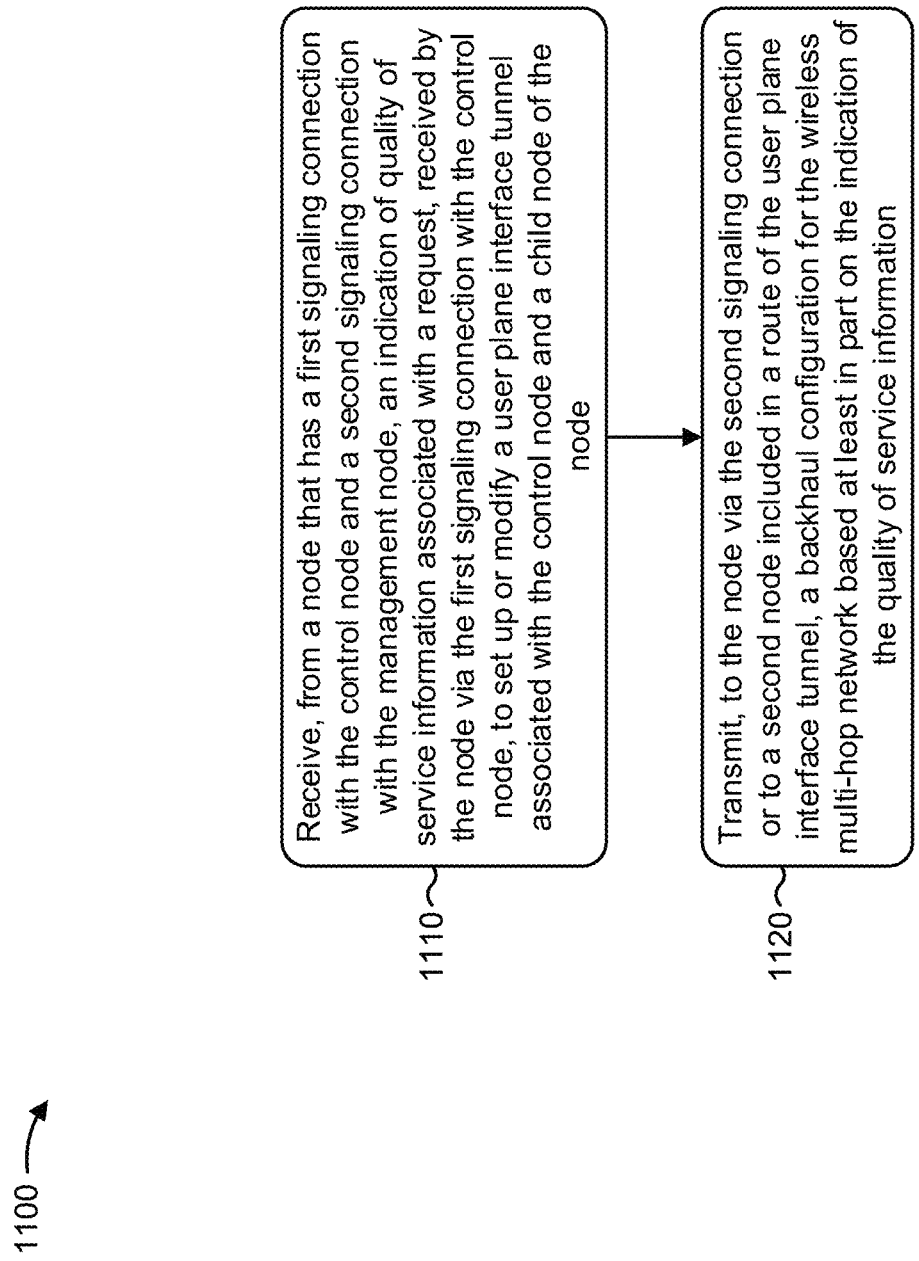

FIG. 11 is a flowchart of an example method 1100 of wireless communication. The method 1100 may be performed by, for example, a management node (e.g., management node 720, an IAB donor, and/or the like).

At 1110, the management node may receive, from a node that has a first signaling connection with the control node and a second signaling connection with the management node, an indication of quality of service information associated with a request, received by the node via the first signaling connection with the control node, to set up or modify a user plane interface tunnel associated with the control node and a child node of the node. For example, the management node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive, from a node that has a first signaling connection with the control node and a second signaling connection with the management node, an indication of quality of service information associated with a request, received by the node via the first signaling connection with the control node, to set up or modify a user plane interface tunnel associated with the control node and a child node of the node, as described above.

In some aspects, the management node is a first integrated access and backhaul (IAB) donor and the control node is a second IAB donor or a base station that is separate from the management node. In some aspects, the first signaling connection is a radio resource control connection or an F1 control plane interface connection, and wherein the second signaling connection is a radio resource control connection or an F1 control plane interface connection. In some aspects, the user plane interface tunnel is an F1 user plane interface tunnel for the child node, and wherein the child node is a user equipment or a mobile termination component of the child node.

In some aspects, the indication of the quality of service information includes at least one of: quality of service information included in the request to set up or modify the user plane interface tunnel, a portion of quality of service information included in the request to set up or modify the user plane interface tunnel, information derived from quality of service information included in the request to set up or modify the user plane interface tunnel, quality of service information associated with an access radio link control channel, between the node and the child node, that is established based at least in part on the request to set up or modify the user plan interface tunnel, an indication of whether the access radio link control channel is associated with an acknowledged mode or an unacknowledged mode, or a combination thereof. In some aspects, the indication of the quality of service information includes at least one of: a control node identifier that identifies the control node, a public land mobile network (PLMN) identifier that identifies a PLMN of the control node or the child node, routing information for communicating with the control node, a user plane interface tunnel identifier that identifies the user plane interface tunnel, a data radio bearer identifier that identifies a data radio bearer associated with the user plane interface tunnel, a child node identifier that identifies the child node, or a combination thereof. In some aspects, the indication of the quality of service information includes a request for a specific backhaul configuration corresponding to a quality of service class.

At 1120, the management node may transmit, to the node via the second signaling connection or to a second node included in a route of the user plane interface tunnel, a backhaul configuration for the wireless multi-hop network based at least in part on the indication of the quality of service information. For example, the management node (e.g., using antenna 234, MOD 232, transmit processor 220, TX MIMO processor 230, controller/processor 240, memory 242, antenna 252, MOD 254, TX MIMO processor 266, transmit processor 264, controller/processor 280, memory 282, and/or the like) may transmit, to the node via the second signaling connection or to a second node included in a route of the user plane interface tunnel, a backhaul configuration for the wireless multi-hop network based at least in part on the indication of the quality of service information, as described above. In some aspects, the backhaul configuration includes at least one of: a configuration for setting up a backhaul radio link control channel at a mobile termination component of the node, an uplink mapping configuration that indicates a mapping between the user plane interface tunnel and at least one of a backhaul adaptation protocol route, an egress link of the node, or the backhaul radio link control channel, address information for a distributed unit component of the node that is an endpoint of the user plane interface tunnel, or a combination thereof.

In some aspects, method 1100 includes transmitting the backhaul configuration to the node and transmitting a second backhaul configuration to the second node based at least in part on the indication of the quality of service information. In some aspects, the second backhaul configuration includes at least one of: a backhaul radio link control channel configuration for a mobile termination component of the second node, a backhaul radio link control channel configuration for a distributed unit component of the second node, a mapping of traffic of the user plane interface tunnel between an ingress backhaul radio link control channel of the second node and an egress backhaul radio link control channel of the second node, or a combination thereof.

In some aspects, method 1100 includes transmitting a third backhaul configuration to a distributed unit component of an integrated access and backhaul (IAB) donor that terminates a backhaul adaptation protocol route to which the user plane interface tunnel is mapped based at least in part on the indication of the quality of service information. In some aspects, the third backhaul configuration includes at least one of: a backhaul radio link control channel configuration for the distributed unit component of the IAB donor, a mapping of downlink traffic of the user plane interface tunnel for the IAB donor, or a combination thereof.

In some aspects, method 1100 includes receiving, from the node, a second indication of second quality of service information associated with a second request, received by the node via the first signaling connection with the control node, to set up or modify a second user plane interface tunnel associated with the control node; and transmitting, to the node via the second signaling connection, a second backhaul configuration for the wireless multi-hop network based at least in part on the second indication, wherein the second backhaul configuration is indicating one of: a second radio is linking control channel for the second user plane interface tunnel that is separate from a first radio link control channel for the user plane interface tunnel, or a is sharing radio link control channel for the user plane interface tunnel and the second user plane interface tunnel. In some aspects, method 1100 includes receiving a notification of release of the user plane interface tunnel; and transmitting an updated backhaul configuration based at least in part on the notification.

Although FIG. 11 shows example blocks of method 1100, in some aspects, method 1100 may include additional blocks, fewer blocks, different blocks, or differently arranged blocks than those depicted in FIG. 11. Additionally, or alternatively, two or more of the blocks of method 1100 may be performed in parallel.

Figure 12:
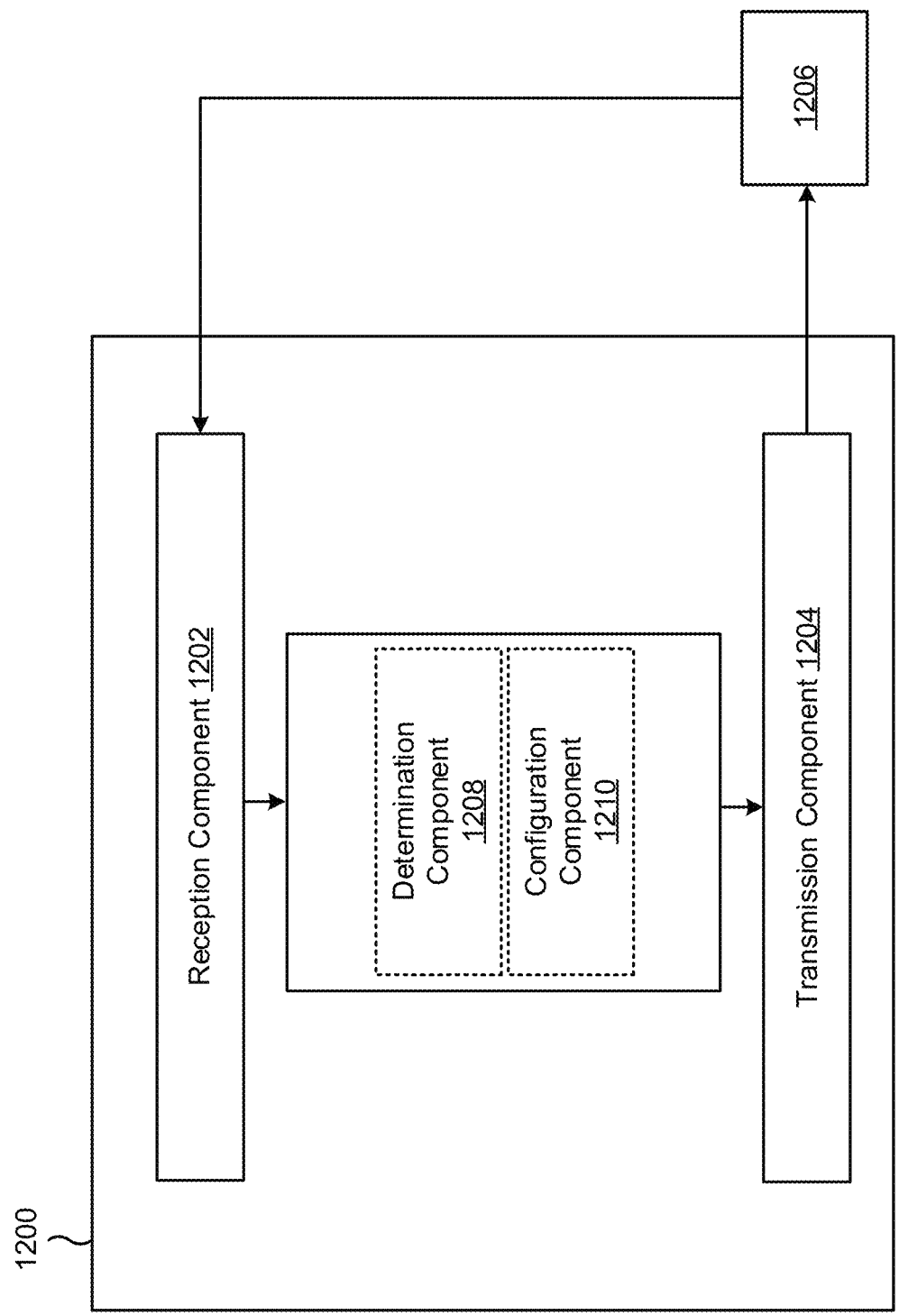
FIG. 12 is a block diagram of an example apparatus for wireless communication.

FIG. 12 is a block diagram of an example apparatus 1200 for wireless communication. The apparatus 1200 may be a node, or a node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208 or a configuration component 1210, among other examples.

In some aspects, the apparatus 1200 may be configured to perform one or more operations described herein in connection with FIGS. 7-9. Additionally or alternatively, the apparatus 1200 may be configured to perform one or more processes described herein, such as method 1000 of FIG. 10. In some aspects, the apparatus 1200 and/or one or more components shown in FIG. 12 may include one or more components of the node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the node described above in connection with FIG. 2. In some aspects, the transmission component 1204 may be co-located with the reception component 1202 in a transceiver.

The reception component 1202 may receive, via a first signaling connection with a control node, a request to set up or modify a user plane interface tunnel associated with the control node and a child node of the node. The determination component 1208 may determine QoS information based at least in part on the request. The transmission component 1204 may transmit, via a second signaling connection with a management node that manages a wireless multi-hop network configuration for the control node, an indication of quality of service information associated with the request from the control node. The reception component 1202 may receive, via the second signaling connection with the management node, a backhaul configuration for the wireless multi-hop network based at least in part on the indication of the quality of service information. The configuration component 1210 may configure the apparatus 1200 based at least in part on the backhaul configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
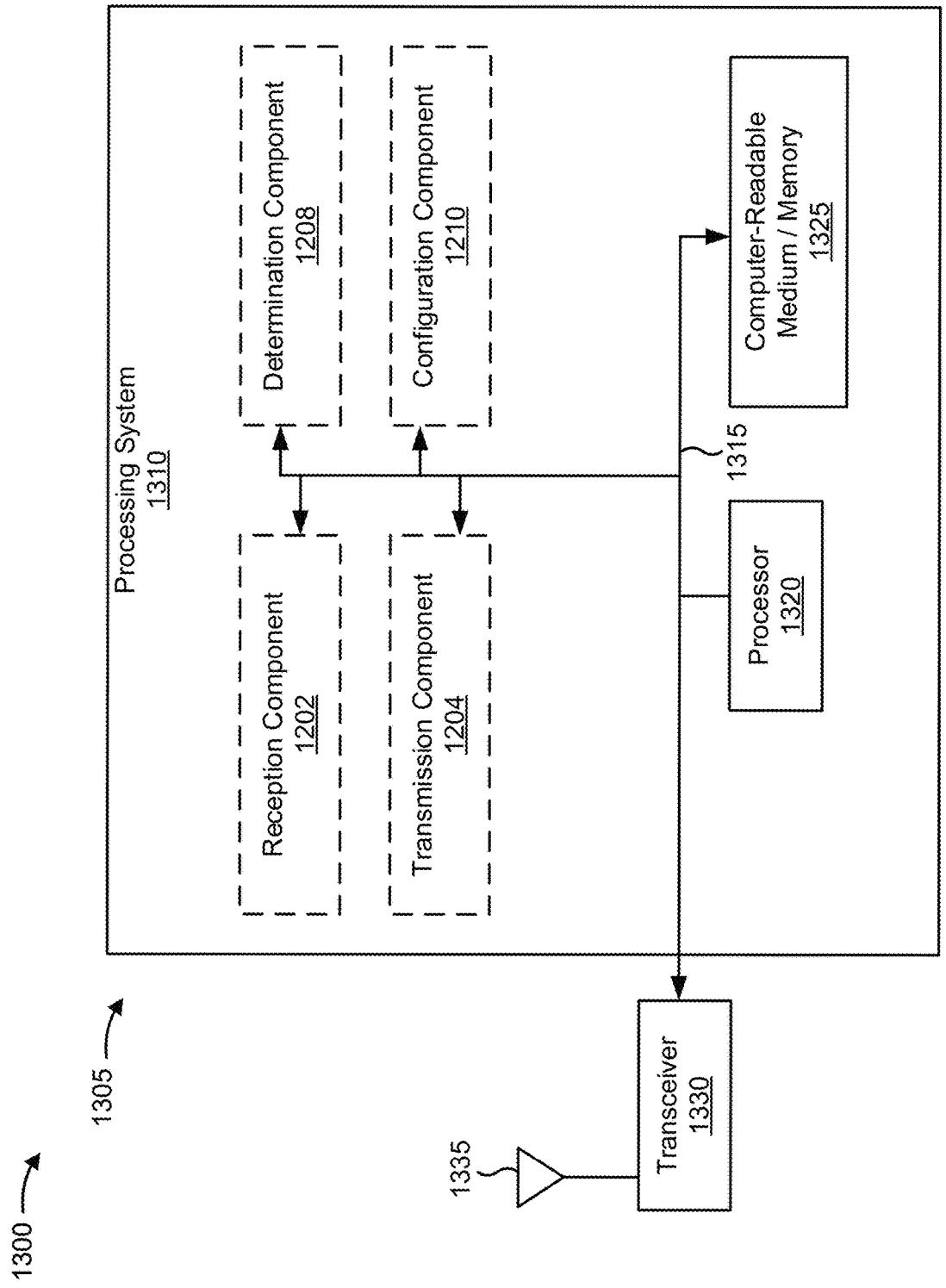
FIG. 13 is a diagram illustrating an example of a hardware implementation for an apparatus employing a processing system.

FIG. 13 is a diagram illustrating an example 1300 of a hardware implementation for an apparatus 1305 employing a processing system 1310. The apparatus 1305 may be a node.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the base station 110 (e.g., an IAB node with components of a base station 110) and may include the memory 242 and/or at least one of the TX MIMO processor 230, the RX processor 238, and/or the controller/processor 240. In some aspects, the apparatus 1305 for wireless communication includes means for receiving, via a first signaling connection with a control node, a request to set up or modify a user plane interface tunnel associated with the control node and a child node of the node; means for transmitting, via a second signaling connection with a management node that manages a wireless multi-hop network configuration for the control node, an indication of quality of service information associated with the request from the control node; means for receiving, via the second signaling connection with the management node, a backhaul configuration for the wireless multi-hop network based at least in part on the indication of the quality of service information; and/or the like. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

Figure 14:
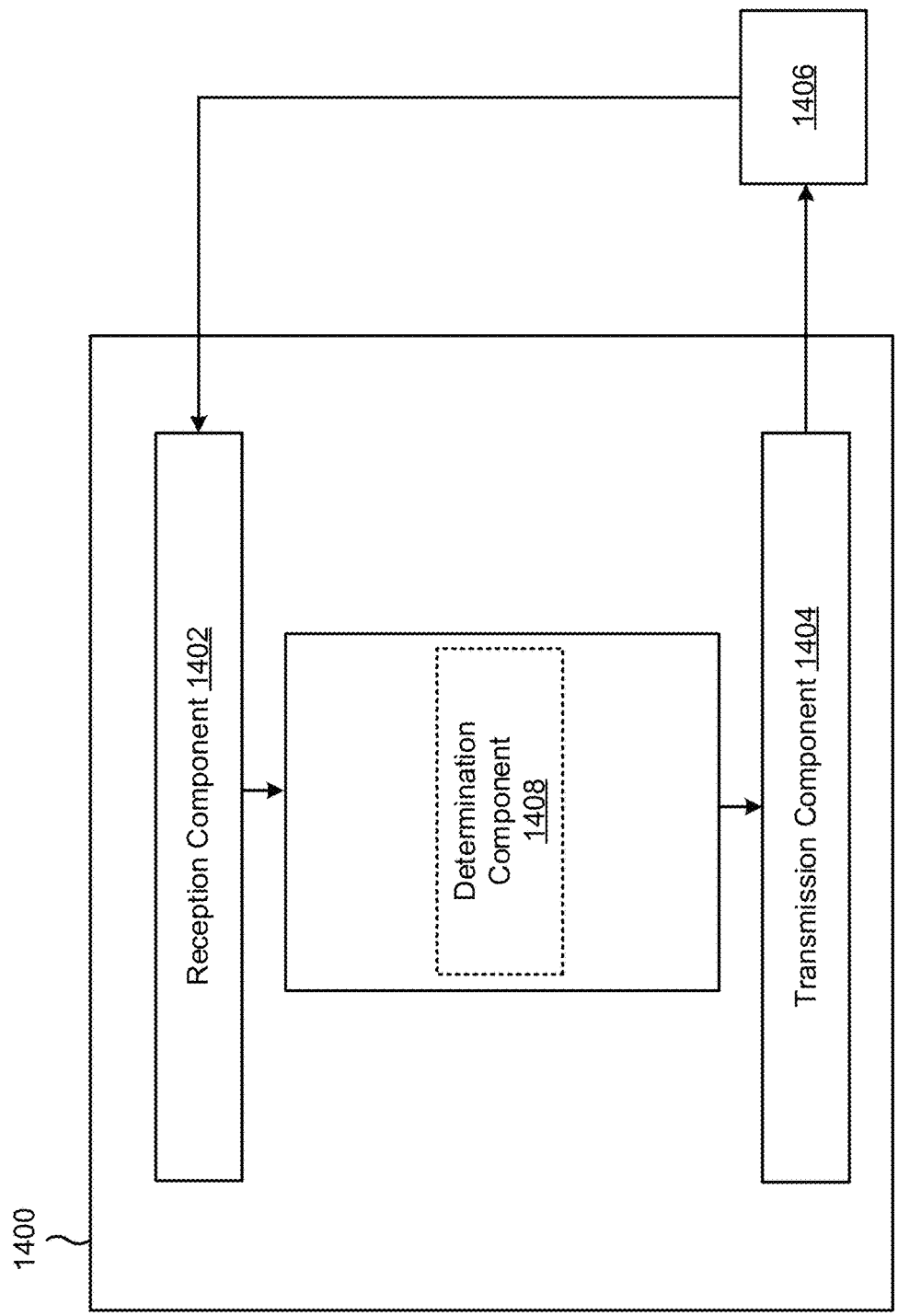
FIG. 14 is a block diagram of an example apparatus for wireless communication.

FIG. 14 is a block diagram of an example apparatus 1400 for wireless communication. The apparatus 1400 may be a management node, or a management node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 7-9. Additionally or alternatively, the apparatus 1400 may be configured to perform one or more processes described herein, such as method 1100 of FIG. 11. In some aspects, the apparatus 1400 and/or one or more components shown in FIG. 14 may include one or more components of the management node described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the management node described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the management node described above in connection with FIG. 2. In some aspects, the transmission component 1404 may be co-located with the reception component 1402 in a transceiver.

The reception component 1402 may receive, from a node that has a first signaling connection with the control node and a second signaling connection with the management node, an indication of quality of service information associated with a request, received by the node via the first signaling connection with the control node, to set up or modify a user plane interface tunnel associated with the control node and a child node of the node. The determination component 1408 may determine a backhaul configuration for the wireless multi-hop network based at least in part on the indication of the quality of service information. The transmission component 1404 may transmit, to the node via the second signaling connection or to a second node included in a route of the user plane interface tunnel, a backhaul configuration for the wireless multi-hop network based at least in part on the indication of the quality of service information.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
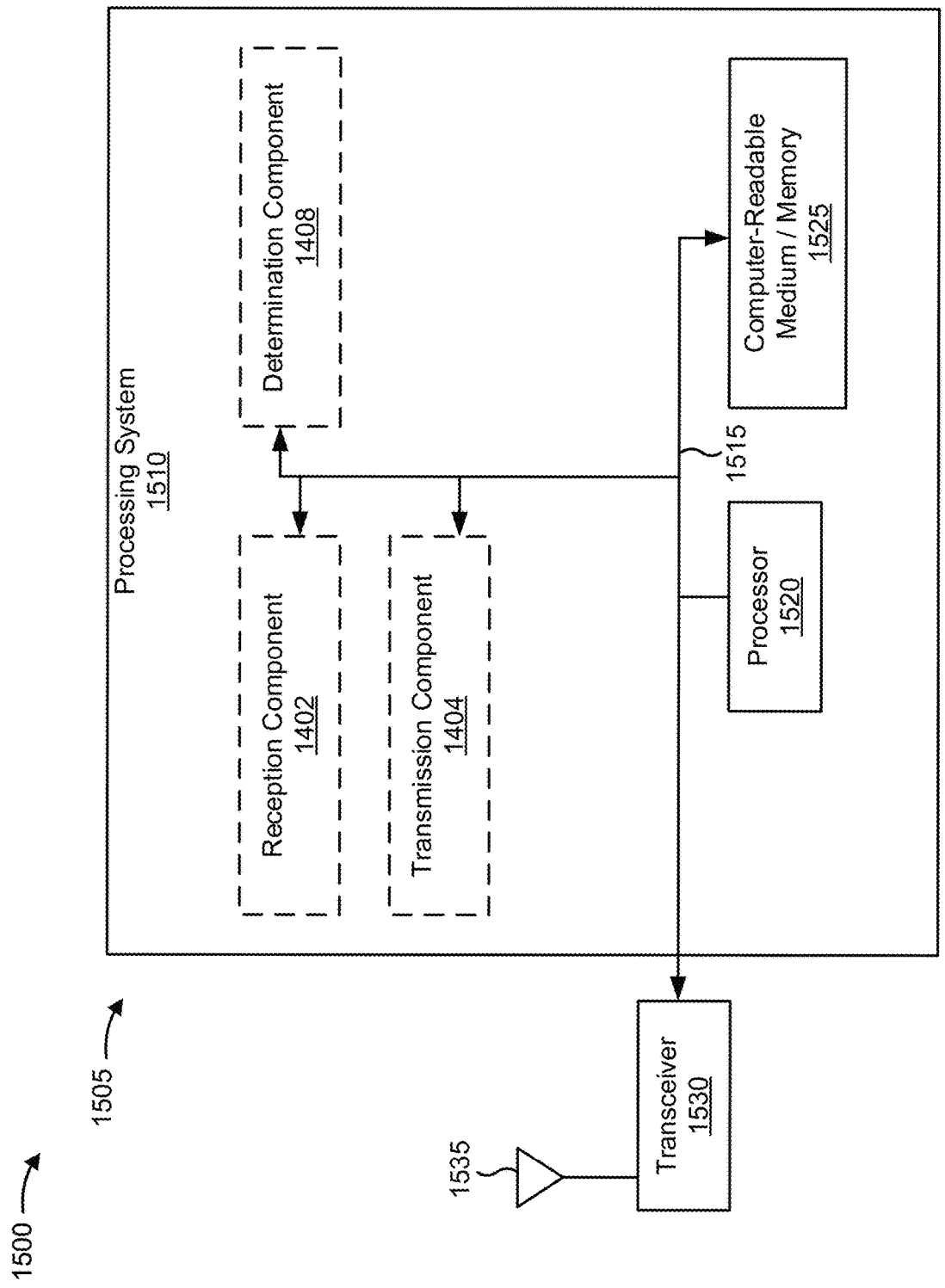
FIG. 15 is a diagram illustrating an example of a hardware implementation for an apparatus employing a processing system.

FIG. 15 is a diagram illustrating an example 1500 of a hardware implementation for an apparatus 1505 employing a processing system 1510. The apparatus 1505 may be a management node.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, power management circuits, and/or the like.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1404, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. The components may be software modules running in the processor 1520, resident/stored in the computer readable medium/memory 1525, one or more hardware modules coupled to the processor 1520, or some combination thereof.

In some aspects, the processing system 1510 may be a component of the base station 110 (e.g., a management node or IAB donor with components of a base station 110), and may include the memory 242 and/or at least one of the TX MIMO processor 230, the RX processor 238, and/or the controller/processor 240. In some aspects, the apparatus 1505 for wireless communication includes means for receiving, from a node that has a first signaling connection with a control node and a second signaling connection with the management node, an indication of quality of service information associated with a request, received by the node via the first signaling connection with the control node, to set up or modify a user plane interface tunnel associated with the control node and a child node of the node; means for transmitting, to the node via the second signaling connection or to a second node included in a route of the user plane interface tunnel, a backhaul configuration for a wireless multi-hop network based at least in part on the indication of the quality of service information; and/or the like. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

The following provides an overview of some Aspects of the present disclosure:

Aspect 1: A method of wireless communication performed by a node in a wireless multi-hop network, comprising: receiving, via a first signaling connection with a control node, a request to set up or modify a user plane interface tunnel associated with the control node and a child node of the node; transmitting, via a second signaling connection with a management node that manages a wireless multi-hop network configuration for the control node, an indication of quality of service information associated with the request from the control node; and receiving, via the second signaling connection with the management node, a backhaul configuration for the wireless multi-hop network based at least in part on the indication of the quality of service information.

Aspect 2: The method of Aspect 1, wherein the child node is in a radio resource control connected mode with the control node.

Aspect 3: The method of any of Aspects 1-2, wherein the management node is a first integrated access and backhaul (IAB) donor and the control node is a second IAB donor or a base station that is separate from the management node.

Aspect 4: The method of any of Aspects 1-3, wherein the first signaling connection is a radio resource control connection or an F1 control plane interface connection.

Aspect 5: The method of any of Aspects 1-4, wherein the second signaling connection is a radio resource control connection or an F1 control plane interface connection.

Aspect 6: The method of any of Aspects 1-5, wherein the user plane interface tunnel is an F1 user plane interface tunnel for the child node, and wherein the child node is a user equipment or a mobile termination component of the child node.

Aspect 7: The method of any of Aspects 1-6, wherein the request to set up or modify the user plane interface tunnel is included in one of a user equipment context setup request message or a user equipment context modification request message.

Aspect 8: The method of any of Aspects 1-7, wherein quality of service information is included in the request or derived from the request.

Aspect 9: The method of any of Aspects 1-8, wherein the request indicates at least one of: quality of service information for a data radio bearer between the control node and the child node, quality of service information for a flow mapped to a data radio bearer between the control node and the child node, or a combination thereof.

Aspect 10: The method of any of Aspects 1-9, wherein the indication of the quality of service information includes at least one of: quality of service information included in the request to set up or modify the user plane interface tunnel, a portion of quality of service information included in the request to set up or modify the user plane interface tunnel, information derived from quality of service information included in the request to set up or modify the user plane interface tunnel, quality of service information associated with an access radio link control channel, between the node and the child node, that is established based at least in part on the request to set up or modify the user plan interface tunnel, an indication of whether the access radio link control channel is associated with an acknowledged mode or an unacknowledged mode, or a combination thereof.

Aspect 11: The method of any of Aspects 1-10, wherein the indication of the quality of service information includes at least one of: a control node identifier that identifies the control node, a public land mobile network (PLMN) identifier that identifies a PLMN of the control node or the child node, routing information for communicating with the control node, a user plane interface tunnel identifier that identifies the user plane interface tunnel, a data radio bearer identifier that identifies a data radio bearer associated with the user plane interface tunnel, a child node identifier that identifies the child node, or a combination thereof.

Aspect 12: The method of any of Aspects 1-11, wherein the indication of the quality of service information includes a request for a specific backhaul configuration corresponding to a quality of service class.

Aspect 13: The method of any of Aspects 1-12, wherein the backhaul configuration includes at least one of: a configuration for setting up a backhaul radio link control channel at a mobile termination component of the node, an uplink mapping configuration that indicates a mapping between the user plane interface tunnel and at least one of a backhaul adaptation protocol route, an egress link of the node, or the backhaul radio link control channel, address information for a distributed unit component of the node that is an endpoint of the user plane interface tunnel, or a combination thereof.

Aspect 14: The method of any of Aspects 1-13, further comprising: transmitting a notification of release of the user plane interface tunnel; and receiving an updated backhaul configuration based at least in part on the notification.

Aspect 15: A method of wireless communication performed by a management node that manages a configuration of a wireless multi-hop network for a control node, comprising: receiving, from a node that has a first signaling connection with the control node and a second signaling connection with the management node, an indication of quality of service information associated with a request, received by the node via the first signaling connection with the control node, to set up or modify a user plane interface tunnel associated with the control node and a child node of the node; and transmitting, to the node via the second signaling connection, a backhaul configuration for the wireless multi-hop network based at least in part on the indication of the quality of service information.

Aspect 16: The method of Aspect 15, wherein the management node is a first integrated access and backhaul (IAB) donor and the control node is a second IAB donor or a base station that is separate from the management node.

Aspect 17: The method of any of Aspects 15-16, wherein the first signaling connection is a radio resource control connection or an F1 control plane interface connection, and wherein the second signaling connection is a radio resource control connection or an F1 control plane interface connection.

Aspect 18: The method of any of Aspects 15-17, wherein the user plane interface tunnel is an F1 user plane interface tunnel for the child node, and wherein the child node is a user equipment or a mobile termination component of the child node.

Aspect 19: The method of any of Aspects 15-18, wherein the indication of the quality of service information includes at least one of: quality of service information included in the request to set up or modify the user plane interface tunnel, a portion of quality of service information included in the request to set up or modify the user plane interface tunnel, information derived from quality of service information included in the request to set up or modify the user plane interface tunnel, quality of service information associated with an access radio link control channel, between the node and the child node, that is established based at least in part on the request to set up or modify the user plan interface tunnel, an indication of whether the access radio link control channel is associated with an acknowledged mode or an unacknowledged mode, or a combination thereof.

Aspect 20: The method of any of Aspects 15-19, wherein the indication of the quality of service information includes at least one of: a control node identifier that identifies the control node, a public land mobile network (PLMN) identifier that identifies a PLMN of the control node or the child node, routing information for communicating with the control node, a user plane interface tunnel identifier that identifies the user plane interface tunnel, a data radio bearer identifier that identifies a data radio bearer associated with the user plane interface tunnel, a child node identifier that identifies the child node, or a combination thereof.

Aspect 21: The method of any of Aspects 15-20, wherein the indication of the quality of service information includes a request for a specific backhaul configuration corresponding to a quality of service class.

Aspect 22: The method of any of Aspects 15-21, wherein the backhaul configuration includes at least one of: a configuration for setting up a backhaul radio link control channel at a mobile termination component of the node, an uplink mapping configuration that indicates a mapping between the user plane interface tunnel and at least one of a backhaul adaptation protocol route, an egress link of the node, or the backhaul radio link control channel, address information for a distributed unit component of the node that is an endpoint of the user plane interface tunnel, or a combination thereof.

Aspect 23: The method of any of Aspects 15-22, further comprising transmitting a second backhaul configuration to a second node included in a route of the user plane interface tunnel based at least in part on the indication of the quality of service information.

Aspect 24: The method of Aspect 23, wherein the second backhaul configuration includes at least one of: a backhaul radio link control channel configuration for a mobile termination component of the second node, a backhaul radio link control channel configuration for a distributed unit component of the second node, a mapping of traffic of the user plane interface tunnel between an ingress backhaul radio link control channel of the second node and an egress backhaul radio link control channel of the second node, or a combination thereof.

Aspect 25: The method of any of Aspects 15-24, further comprising transmitting a third backhaul configuration to a distributed unit component of an integrated access and backhaul (IAB) donor that terminates a backhaul adaptation protocol route to which the user plane interface tunnel is mapped based at least in part on the indication of the quality of service information.

Aspect 26: The method of Aspect 25, wherein the third backhaul configuration includes at least one of: a backhaul radio link control channel configuration for the distributed unit component of the IAB donor, a mapping of downlink traffic of the user plane interface tunnel for the IAB donor, or a combination thereof.

Aspect 27: The method of any of Aspects 15-26, further comprising: receiving, from the node, a second indication of second quality of service information associated with a second request, received by the node via the first signaling connection with the control node, to set up or modify a second user plane interface tunnel associated with the control node; and transmitting, to the node via the second signaling connection, a second backhaul configuration for the wireless multi-hop network based at least in part on the second indication, wherein the second backhaul configuration indicates one of: a second radio link control channel for the second user plane interface tunnel that is separate from a first radio link control channel for the user plane interface tunnel, or a shared radio link control channel for the user plane interface tunnel and the second user plane interface tunnel.

Aspect 28: The method of any of Aspects 15-27, further comprising: receiving a notification of release of the user plane interface tunnel; and transmitting an updated backhaul configuration based at least in part on the notification.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A node for wireless communication in a wireless multi-hop network, comprising:
   a memory; and
   one or more processors, coupled to the memory, configured to:
   receive, via a first signaling connection and from a control node, a request to set up or modify a user plane interface tunnel associated with the control node and a child node of the node;
   transmit, via a second signaling connection and to a management node that manages a wireless multi-hop network configuration for the control node, an indication of quality of service information associated with the request from the control node; and
   receive, via the second signaling connection and from the management node, a backhaul configuration for the wireless multi-hop network based at least in part on the indication of the quality of service information.

2. The node of claim 1, wherein the child node is in a radio resource control connected mode with the control node.

3. The node of claim 1, wherein the management node is a first integrated access and backhaul (IAB) donor and the control node is a second IAB donor or a base station that is separate from the management node.

4. The node of claim 1, wherein the first signaling connection is a radio resource control connection or an F1 control plane interface connection, and wherein the second signaling connection is a radio resource control connection or an F1 control plane interface connection.

5. The node of claim 1, wherein the user plane interface tunnel is an F1 user plane interface tunnel for the child node, and wherein the child node is a user equipment or a mobile termination component of the child node.

6. The node of claim 1, wherein the request to set up or modify the user plane interface tunnel is included in one of a user equipment context setup request message or a user equipment context modification request message.

7. The node of claim 1, wherein quality of service information is included in the request or derived from the request.

8. The node of claim 1, wherein the request indicates at least one of:
   quality of service information for a data radio bearer between the control node and the child node,
   quality of service information for a flow mapped to a data radio bearer between the control node and the child node, or
   a combination thereof.

9. The node of claim 1, wherein the indication of the quality of service information includes at least one of:
   quality of service information included in the request to set up or modify the user plane interface tunnel,
   a portion of quality of service information included in the request to set up or modify the user plane interface tunnel,
   information derived from quality of service information included in the request to set up or modify the user plane interface tunnel,
   quality of service information associated with an access radio link control channel, between the node and the child node, that is established based at least in part on the request to set up or modify the user plan interface tunnel,
   an indication of whether the access radio link control channel is associated with an acknowledged mode or an unacknowledged mode,
   a request for a specific backhaul configuration corresponding to a quality of service class, or
   a combination thereof.

10. The node of claim 1, wherein the indication of the quality of service information includes at least one of:
   a control node identifier that identifies the control node,
   a public land mobile network (PLMN) identifier that identifies a PLMN of the control node or the child node,
   routing information for communicating with the control node,
   a user plane interface tunnel identifier that identifies the user plane interface tunnel,
   a data radio bearer identifier that identifies a data radio bearer associated with the user plane interface tunnel,
   a child node identifier that identifies the child node, or
   a combination thereof.

11. The node of claim 1, wherein the backhaul configuration includes at least one of:
   a configuration for setting up a backhaul radio link control channel at a mobile termination component of the node,
   an uplink mapping configuration that indicates a mapping between the user plane interface tunnel and at least one of a backhaul adaptation protocol route, an egress link of the node, or the backhaul radio link control channel,
   address information for a distributed unit component of the node that is an endpoint of the user plane interface tunnel, or
   a combination thereof.

12. The node of claim 1, wherein the one or more processors are further configured to:
   transmit a notification of release of the user plane interface tunnel; and
   receive an updated backhaul configuration based at least in part on the notification.

13. A management node for wireless communication that manages a configuration of a wireless multi-hop network for a control node, comprising:
   a memory; and
   one or more processors, coupled to the memory, configured to:
      receive, from a node that has a first signaling connection with the control node and a second signaling connection with the management node, an indication of quality of service information associated with a request, received by the node via the first signaling connection and from the control node, to set up or modify a user plane interface tunnel associated with the control node and a child node of the node; and
      transmit, to the node via the second signaling connection or to a second node included in a route of the user plane interface tunnel, a backhaul configuration for the wireless multi-hop network based at least in part on the indication of the quality of service information.

14. The management node of claim 13, wherein the management node is a first integrated access and backhaul (IAB) donor and the control node is a second IAB donor or a base station that is separate from the management node.

15. The management node of claim 13, wherein the first signaling connection is a radio resource control connection or an F1 control plane interface connection, and wherein the second signaling connection is a radio resource control connection or an F1 control plane interface connection.

16. The management node of claim 13, wherein the user plane interface tunnel is an F1 user plane interface tunnel for the child node, and wherein the child node is a user equipment or a mobile termination component of the child node.

17. The management node of claim 13, wherein the indication of the quality of service information includes at least one of:
   quality of service information included in the request to set up or modify the user plane interface tunnel,
   a portion of quality of service information included in the request to set up or modify the user plane interface tunnel,
   information derived from quality of service information included in the request to set up or modify the user plane interface tunnel,
   quality of service information associated with an access radio link control channel, between the node and the child node, that is established based at least in part on the request to set up or modify the user plan interface tunnel,
an indication of whether the access radio link control channel is associated with an acknowledged mode or an unacknowledged mode,
a request for a specific backhaul configuration corresponding to a quality of service class, or
a combination thereof.

18. The management node of claim 13, wherein the indication of the quality of service information includes at least one of:
a control node identifier that identifies the control node,
a public land mobile network (PLMN) identifier that identifies a PLMN of the control node or the child node,
routing information for communicating with the control node,
a user plane interface tunnel identifier that identifies the user plane interface tunnel,
a data radio bearer identifier that identifies a data radio bearer associated with the user plane interface tunnel,
a child node identifier that identifies the child node, or
a combination thereof.

19. The management node of claim 13, wherein the backhaul configuration includes at least one of:
a configuration for setting up a backhaul radio link control channel at a mobile termination component of the node,
an uplink mapping configuration that indicates a mapping between the user plane interface tunnel and at least one of a backhaul adaptation protocol route, an egress link of the node, or the backhaul radio link control channel,
address information for a distributed unit component of the node that is an endpoint of the user plane interface tunnel, or
a combination thereof.

20. The management node of claim 13, wherein the one or more processors are further configured to transmit the backhaul configuration to the node and transmit a second backhaul configuration to the second node based at least in part on the indication of the quality of service information.

21. The management node of claim 20, wherein the second backhaul configuration includes at least one of:
a backhaul radio link control channel configuration for a mobile termination component of the second node,
a backhaul radio link control channel configuration for a distributed unit component of the second node,
a mapping of traffic of the user plane interface tunnel between an ingress backhaul radio link control channel of the second node and an egress backhaul radio link control channel of the second node, or
a combination thereof.

22. The management node of claim 13, wherein the one or more processors are further configured to transmit a third backhaul configuration to a distributed unit component of an integrated access and backhaul (IAB) donor that terminates a backhaul adaptation protocol route to which the user plane interface tunnel is mapped based at least in part on the indication of the quality of service information.

23. The management node of claim 22, wherein the third backhaul configuration includes at least one of:
a backhaul radio link control channel configuration for the distributed unit component of the IAB donor,
a mapping of downlink traffic of the user plane interface tunnel for the IAB donor, or
a combination thereof.

24. The management node of claim 13, wherein the one or more processors are further configured to:
receive, from the node, a second indication of second quality of service information associated with a second request, received by the node via the first signaling connection with the control node, to set up or modify a second user plane interface tunnel associated with the control node; and
transmit, to the node via the second signaling connection, a second backhaul configuration for the wireless multi-hop network based at least in part on the second indication, wherein the second backhaul configuration indicates one of:
a second radio link control channel for the second user plane interface tunnel that is separate from a first radio link control channel for the user plane interface tunnel, or
a shared radio link control channel for the user plane interface tunnel and the second user plane interface tunnel.

25. The management node of claim 13, wherein the one or more processors are further configured to:
receive a notification of release of the user plane interface tunnel; and
transmit an updated backhaul configuration based at least in part on the notification.

26. A method of wireless communication performed by a node in a wireless multi-hop network, comprising:
receiving, via a first signaling connection and from a control node, a request to set up or modify a user plane interface tunnel associated with the control node and a child node of the node;
transmitting, via a second signaling connection and to a management node that manages a wireless multi-hop network configuration for the control node, an indication of quality of service information associated with the request from the control node; and
receiving, via the second signaling connection and from the management node, a backhaul configuration for the wireless multi-hop network based at least in part on the indication of the quality of service information.

27. The method of claim 26, wherein the backhaul configuration includes at least one of:
a configuration for setting up a backhaul radio link control channel at a mobile termination component of the node,
an uplink mapping configuration that indicates a mapping between the user plane interface tunnel and at least one of a backhaul adaptation protocol route, an egress link of the node, or the backhaul radio link control channel,
address information for a distributed unit component of the node that is an endpoint of the user plane interface tunnel, or
a combination thereof.

28. A method of wireless communication performed by a management node that manages a configuration of a wireless multi-hop network for a control node, comprising:
receiving, from a node that has a first signaling connection with the control node and a second signaling connection with the management node, an indication of quality of service information associated with a request, received by the node via the first signaling connection and from the control node, to set up or modify a user plane interface tunnel associated with the control node and a child node of the node; and
transmitting, to the node via the second signaling connection or to a second node included in a route of the user plane interface tunnel, a backhaul configuration for the wireless multi-hop network based at least in part on the indication of the quality of service information.

29. The method of claim 28, wherein the backhaul configuration includes at least one of:
- a configuration for setting up a backhaul radio link control channel at a mobile termination component of the node,
- an uplink mapping configuration that indicates a mapping between the user plane interface tunnel and at least one of a backhaul adaptation protocol route, an egress link of the node, or the backhaul radio link control channel,
- address information for a distributed unit component of the node that is an endpoint of the user plane interface tunnel, or
- a combination thereof.

30. The method of claim 28, further comprising transmitting the backhaul configuration to the node and transmitting a second backhaul configuration to the second node based at least in part on the indication of the quality of service information, wherein the second backhaul configuration includes at least one of:
- a backhaul radio link control channel configuration for a mobile termination component of the second node,
- a backhaul radio link control channel configuration for a distributed unit component of the second node,
- a mapping of traffic of the user plane interface tunnel between an ingress backhaul radio link control channel of the second node and an egress backhaul radio link control channel of the second node, or
- a combination thereof.

* * * * *